US008286145B2

(12) United States Patent
Kawabata et al.

(10) Patent No.: US 8,286,145 B2
(45) Date of Patent: Oct. 9, 2012

(54) PROGRAM RE-WRITING APPARATUS

(75) Inventors: Teruo Kawabata, Osaka (JP); Masatsugu Daimon, Nara (JP); Taketo Heishi, Osaka (JP); Hajime Ogawa, Osaka (JP)

(73) Assignee: Panasonic Corporation, Osaka (JP)

(*) Notice: Subject to any disclaimer, the term of this patent is extended or adjusted under 35 U.S.C. 154(b) by 1205 days.

(21) Appl. No.: 12/107,450

(22) Filed: Apr. 22, 2008

(65) Prior Publication Data

US 2008/0295082 A1     Nov. 27, 2008

(30) Foreign Application Priority Data

May 25, 2007   (JP) ................................. 2007-139671

(51) Int. Cl.
*G06F 9/45*       (2006.01)
(52) U.S. Cl. ....................................................... 717/136
(58) Field of Classification Search .................... None
See application file for complete search history.

(56) References Cited

U.S. PATENT DOCUMENTS

| 5,625,835 | A |   | 4/1997 | Ebcioglu et al. |
| 5,897,666 | A | * | 4/1999 | Mallick et al. ............... 711/217 |
| 5,918,005 | A |   | 6/1999 | Moreno et al. |
| 6,378,057 | B1|   | 4/2002 | Kurokawa |
| 6,505,296 | B2|   | 1/2003 | Morris et al. |
| 6,889,315 | B2|   | 5/2005 | Miyake et al. |
| 6,938,131 | B2|   | 8/2005 | Ogasawara |
| 7,035,995 | B2|   | 4/2006 | Henry et al. |
| 7,181,576 | B2|   | 2/2007 | Gammel et al. |
| 7,698,696 | B2|   | 4/2010 | Ogawa et al. |
| 2001/0004757 | A1 |   | 6/2001 | Miyake et al. |
| 2002/0010851 | A1 |   | 1/2002 | Morris et al. |
| 2002/0066090 | A1 | * | 5/2002 | Babaian et al. ............... 717/156 |
| 2002/0087815 | A1 |   | 7/2002 | Arimilli et al. |
| 2002/0124156 | A1 | * | 9/2002 | Yoaz et al. ..................... 712/225 |
| 2004/0098713 | A1 |   | 5/2004 | Ogawa et al. |
| 2004/0117600 | A1 |   | 6/2004 | Bodas et al. |

(Continued)

FOREIGN PATENT DOCUMENTS

JP              5-040629         2/1993

(Continued)

OTHER PUBLICATIONS

Japan Office action, mail date is Oct. 25, 2011.

(Continued)

*Primary Examiner* — Wei Zhen
*Assistant Examiner* — Adam Banes
(74) *Attorney, Agent, or Firm* — Greenblum & Bernstein, P.L.C.

(57) ABSTRACT

A program re-writing method which re-writes an inputted program into a program for a processor for controlling whether or not a process is executed based on a yes or no execution flag, said program re-writing method including: inserting a comparison process into the inputted program, the comparison process comparing first address information, which is memory address information accessed by a first memory access process included in the inputted program, and second address information, which is address information of a memory accessed by a second memory access process included in the inputted program, and writing a comparison result into the yes or no execution flag; and inserting a yes or no execution flag-attached logic preservation process into the inputted program, the yes or no execution flag-attached logic preservation process being a process executed based on a value of the yes or no execution flag and preserving the same result as a result of the inputted program when executed.

29 Claims, 33 Drawing Sheets

U.S. PATENT DOCUMENTS

| | | | |
|---|---|---|---|
| 2004/0148475 A1 | 7/2004 | Ogasawara | |
| 2007/0050299 A1 | 3/2007 | Sumida et al. | |
| 2007/0180025 A1 | 8/2007 | Kobayakawa et al. | |
| 2007/0234014 A1* | 10/2007 | Kobayashi et al. | 712/220 |
| 2008/0047000 A1 | 2/2008 | Kanamaru et al. | |
| 2008/0069245 A1 | 3/2008 | Kadono et al. | |
| 2009/0106744 A1* | 4/2009 | Li et al. | 717/151 |
| 2010/0175056 A1 | 7/2010 | Ogawa et al. | |

FOREIGN PATENT DOCUMENTS

| | | |
|---|---|---|
| JP | 8-314721 | 11/1996 |
| JP | 10-269080 | 10/1998 |
| JP | 2001-175475 | 6/2001 |
| JP | 2001-520415 | 10/2001 |
| JP | 2002-024010 | 1/2002 |
| JP | 2003-323415 | 11/2003 |
| JP | 2004-038597 | 2/2004 |
| JP | 3762597 | 1/2006 |
| WO | 99/19795 | 4/1999 |

OTHER PUBLICATIONS

English language Abstract of JP 2001-175475.

* cited by examiner

FIG. 1

```
void func(int * pA, int* pB)
{
        int i;
        for (i=0; i<100; i++){
                *pA++=*pB++;//(first time)
                *pA++=*pB++;//(second time)
        }
}
```

FIG. 2A  No speculative load command

```
        mov     r14,0
        mov     r15,100
LOOP_TOP
        ld      r10,(r1+)      // *pB++ memory reference (first time)
        nop                    //Depending on memory reference
        nop                    //Penalty cycle      // *pA++ memory substitution (first time)
        st      (r0+),r10      // *pB++ memory reference (second time)
        ld      r11,(r1+)
        nop                    //Depending on memory reference
        nop                    //Penalty cycle      // *pA++ memory substitution (second time)
        st      (r0+),r11
        add     r14,1
        cmplt   C6,r14,r15
[C6]    br      LOOP_TOP       // for branch process
```

FIG. 2B  Yes speculative load command

```
        mov     r14,0
        mov     r15,100
LOOP_TOP
        ld      r10,(r1+)      // *pB++ memory reference (first time)
        ld.spc  r11,(r1+)      // *pB++ speculative memory reference (second time)
        nop                    //Penalty cycle according to memory reference
        st      (r0+),r10      // *pA++ memory substitution (first time)
        st      (r0+),r11      // *pA++ memory reference (second time)
        add     r14,1
        cmplt   C6,r14,r15
[C6]    br      LOOP_TOP       // for branch process
```

FIG. 10A

Source program (same object sizes)
```
void func(int * pA, int* pB)
{
            *pA++=*pB++;//(first time)
            *pA++=*pB++;//(second time)
}
```

FIG. 10B (a) Intermediate code before dependence relaxation

Ambiguous memory dependence resulting from reading from the memory resource (r1+) when the memory resource (r0+) is written to

```
ld    r10,(r1+)   //*pB++ memory reference (first time)
nop   //Depending on memory reference
nop   //Penalty cycle
st    (r0+),r10   //*pA++ memory substitution (first time)
ld    r11,(r1+)   //*pB++ memory reference (second time)
nop   //Depending on memory reference
nop   //Penalty cycle
st    (r0+),r11   //*pA++ memory substitution (second time)
```

Conversion (b) Intermediate code after dependence relaxation

Relaxes ambiguous memory dependence resulting from reading from the memory resource (r1+) when the memory resource (r0+) is written to

```
ld        r10,(r1+)    //*pB++ memory reference (first time)
cmpeq     C0,r1,r0     //Address comparison process
ld        r11,(r1+)    //*pB++ memory reference (second time)
[C0] mov  r11,r10      //Correction command with yes/no execution flag
st        (r0+),r10    //*pA++ memory substitution (first time)
st        (r0+),r11    //*pA++ memory substitution (second time)
```

FIG. 10C (a) Critical paths before dependence relaxation : 7cycle

```
ld    r10,(r1+)    //*pB++ memory reference (first time)
       ↓ Dependence distance 3
st    (r0+),r10    //*pA++ memory substitution (first time)
       ↓ Dependence distance 1 (ambiguous memory dependence)
ld    r11,(r1+)    //*pB++ memory reference (second time)
       ↓ Dependence distance 3
st    (r0+),r11    //*pA++ memory substitution (second time)
```

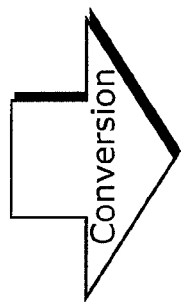
Conversion (b) Critical paths after dependence relaxation : 4cycle

```
ld         r10,(r1+)    //*pB++ memory reference (first time)
            ↓ Dependence distance 3
[C0] mov   r11,r10      //Correction command with yes/no execution flag
            ↓ Dependence distance 1
st         (r0+),r11    //*pA++ memory substitution (second time)
```

FIG. 11A

Source program (differing object sizes)
```
void func(int * pA, short* pB)
{
            *pA++=(int) *pB++;//(first time)
            *pA++=(int) *pB++;//(second time)
}
```

FIG. 11B

(a) Intermediate code before dependence relaxation

```
ldh    r10,(r1+)      // *pB++ memory reference (first time)
nop    //Depending on memory reference
nop    //Penalty cycle
st     (r0+),r10      // *pA++ memory substitution (first time)
ldh    r11,(r1+)      // *pB++ memory reference (second time)
nop    //Depending on memory reference
nop    //Penalty cycle
st     (r0+),r11      // *pA++ memory substitution (second time)
```

(b) Intermediate code after dependence relaxation

```
ldh        r10,(r1+)           // *pB++ memory reference (first time)
xor        r2,r1,r0            //Address range comparison process
ldh        r11,(r1+)           // *pB++ memory reference (second time)
cmpeq      C0,r2,0             //Address range comparison process
cmpeq      C1,r2,2             //Address range comparison process
[C0] extr  r11,r10,15,0        //Correction command with yes/no execution flag
[C1] extr  r11,r10,31,16       //Correction command with yes/no execution flag
st         (r0+),r10           // *pA++ memory substitution (first time)
st         (r0+),r11           // *pA++ memory substitution (second time)
```

FIG. 11C

(a) Critical paths before dependence relaxation : 7cycle

```
ldh    r10,(r1+)      // *pB++ memory reference (first time)
       ↓ Dependence distance 3
st     (r0+),r10      // *pA++ memory substitution (first time)
       ↓ Dependence distance 1 (ambiguous memory dependence)
ldh    r11,(r1+)      // *pB++ memory reference (second time)
       ↓ Dependence distance 3
st     (r0+),r11      // *pA++ memory substitution (second time)
```

(b) Critical paths after dependence relaxation : 4cycle

```
ld         r10,(r1+)         // *pB++ memory reference (first time)
           ↓ Dependence distance 3
[C0] extr  r11,r10,15,0      //Correction command with yes/no execution flag
[C1] extr  r11,r10,31,16     //Correction command with yes/no execution flag
           ↓ Dependence distance 1
sth        (r0+),r11         // *pA++ memory substitution (second time)
```

Memory image of correction process

FIG. 12A

Source program (differing object sizes)
```
void func(short* pA, int* pB)
{
          *pA++=(short) *pB++;//(first time)
          *pA++=(short) *pB++;//(second time)
}
```

FIG. 12B

(a) Intermediate code before dependence relaxation

```
ld    r10,(r1+)      // *pB++ memory reference (first time)
nop                  //Depending on memory reference
nop                  //Penalty cycle
st    (r0+),r10      // *pA++ memory substitution (first time)
ld    r11,(r1+)      // *pB++ memory reference (second time)
nop                  //Depending on memory reference
nop                  //Penalty cycle
st    (r0+),r11      // *pA++ memory substitution (second time)
```

(b) Intermediate code after dependence relaxation

```
ldh        r10,(r1+)         // *pB++ memory reference (first time)
xor        r2,r1,r0          //Address range comparison process
ld         r11,(r1+)         // *pB++ memory reference (second time)
cmpeq      C0,r2,0           //Address range comparison process
cmpeq      C1,r2,2           //Address range comparison process
[C0] valn  r11,r10,r11       //Overwrite bottom 16 bits with r10
[C1] valn  r11,r11,r10       //Overwrite top 16 bits with r10
sth        (r0+),r10         // *pA++ memory substitution (first time)
sth        (r0+),r11         // *pA++ memory substitution (second time)
```

FIG. 12C (a) Critical paths before dependence relaxation : 7cycle

```
ld    r10,(r1+)      // *pB++ memory reference (first time)
      ↓ Dependence distance 3
sth   (r0+),r10      // *pA++ memory substitution (first time)
      ↓ Dependence distance 1 (ambiguous memory dependence)
ld    r11,(r1+)      // *pB++ memory reference (second time)
      ↓ Dependence distance 3
sth   (r0+),r11      // *pA++ memory substitution (second time)
```

Conversion (b) Critical paths after dependence relaxation : 4cycle

```
ld         r10,(r1+)        // *pB++ memory reference (first time)
           ↓ Dependence distance 3
[C0] valn  r11,r10,r11      //Overwrite bottom 16 bits with r10
[C1] valn  r11,r11,r10      //Overwrite top 16 bits with r10
           ↓ Dependence distance 1
sth        (r0+),r11        // *pA++ memory substitution (second time)
```

Memory image of correction process

FIG. 13A

Source program (fixed increase value)
```
void func(int * pA, int* pB){
    int i;
    for (i=0;i<100;i++) {
            *pA++=*pB++;//(first time)
            *pA++=*pB++;//(second time)
    }
}
```

FIG. 13B (a)
Intermediate code before dependence relaxation

> Ambiguous memory dependence resulting from reading from the memory resource (r1+) when the memory resource (r0+) is written to

```
        mov    r14,0
        mov    r15,100
LOOP_TOP
        ld     r10,(r1+)       // *pB++ memory reference (first time)
        nop    //Depending on memory reference
        nop    //Penalty cycle    // *pA++ memory substitution (first time)
        st     (r0+),r10       // *pB++ memory reference (second time)
        ld     r11,(r1+)
        nop    //Depending on memory reference
        nop    //Penalty cycle    // *pA++ memory substitution (second time)
        st     (r0+),r11
        add    r14,1
        cmplt  C6,r14,r15      // for branch process
[C6]    br     LOOP_TOP
```

Conversion

> Relaxes the ambiguous memory dependence, resulting from reading from the memory resource (r1+) when the memory resource (r0+) is written to (b)
Intermediate code after dependence relaxation

```
        mov    r14,0
        mov    r15,100
        cmpeq  C0,r1,r0        //address comparison process
LOOP_TOP
        ld     r10,(r1+)       // *pB++ memory reference (first time)
        ld     r11,(r1+)       // *pB++ memory reference (second time)
[C0]    mov    r11,r10         //correction command with yes/no executable flag
        st     (r0+),r10       // *pA++ memory substitution (first time)
        st     (r0+),r11       // *pA++ memory substitution (second time)
        add    r14,1
        cmplt  C6,r14,r15
[C6]    br     LOOP_TOP        // for branch process
```

FIG. 14A

Source program (non-fixed increase value)

```
void func(int * pA, int* pB, int inc){
        int i;
        for (i=0;i<100;i++) {
                *pA++=*pB++;//(first time)
                pA+=inc;
                *pA++=*pB++;//(second time)
        }
}
```

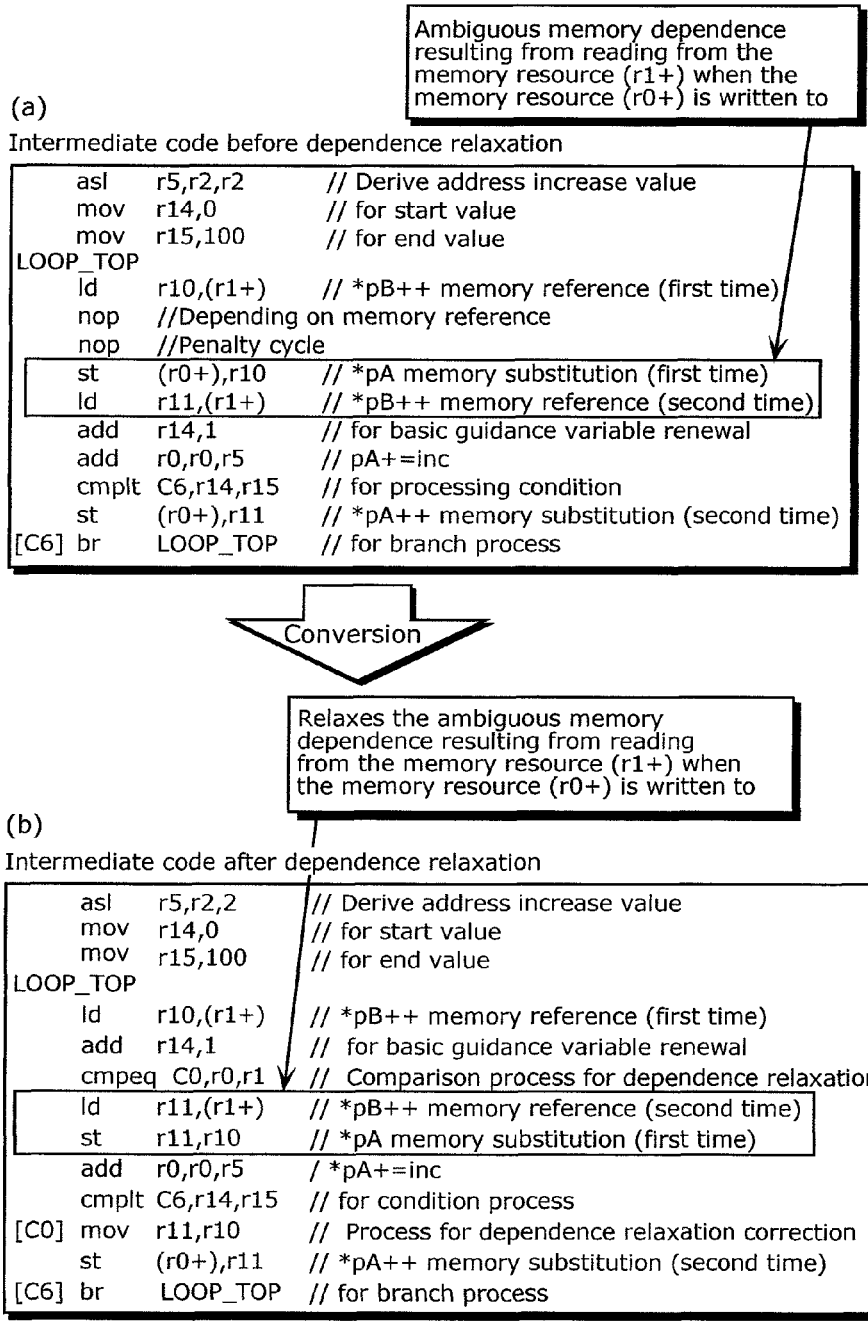

FIG. 15A

Input source program
```
void func(int * pA, short* pB){
        int i;
        for (i=0;i<100;i++) {
                *pA++=(int) *pB++;//(first time)
                *pA++=(int) *pB++;//(second time)
        }
}
```

FIG. 15B (a)
Intermediate code before dependence relaxation

> Ambiguous memory dependence resulting from reading from the memory resource (r1+) when the memory resource (r0+) is written to

```
        mov    r14,0
        mov    r15,100
LOOP_TOP
        ldh    r10,(r1+)      // *pB++ memory reference (first time)
        nop                   //Depending on memory reference
        nop    //Penalty cycle  // *pA++ memory substitution (first time)
        st     (r0+),r10      // *pB++ memory reference (second time)
        ldh    r10,(r1+)
        nop                   //Depending on memory reference
        nop    //Penalty cycle  // *pA++ memory substitution (second time)
        st     (r0+),r10
        add    r14,1
        cmplt  C6,r14,r15     // for branch process
[C6]    br     LOOP_TOP
```

Conversion

> Relaxes the ambiguous memory dependence resulting from reading from the memory resource (r1+) when the memory resource (r0+) is written to (b)
Intermediate code after dependence relaxation

```
        mov    r14,0
        mov    r15,100
LOOP_TOP
        ldh    r10,(r1+)     // *pB++ memory reference (first time)
        xor    r2,r1,r0      // Address range comparison process
        ldh    r11,(r1+)     // *pB++ memory reference (second time)
        cmpeq  C0,r2,0       // Address range comparison process
        cmpeq  C1,r2,2       // Address range comparison process
[C0]    extr   r11,r10,15,0  // Correction process with yes/no executable flag
[C1]    extr   r11,r10,31,16 //Correction process with yes/no executable flag
        st     (r0+),r10     // *pA++ memory substitution (first time)
        st     (r0+),r11     // *pA++ memory substitution (second time)
        add    r14,1
        cmplt  C6,r14,r15
[C6]    br     LOOP_TOP      // for branch process
```

FIG. 16A

Input source program

```
void func(short * pA, int* pB)
{
        int i;
        for (i=0;i<100;i++) {
                *pA++=(short) *pB++;//(first time)
                *pA++=(short) *pB++;//(second time)
        }
}
```

FIG. 16B (a) Intermediate code before dependence relaxation

> Ambiguous memory dependence resulting from reading from the memory resource (r1+) when the memory resource (r0+) is written to

```
        mov   r14,0
        mov   r15,100
LOOP_TOP
        ld    r10,(r1+)      // *pB++ memory reference (first time)
        nop   //Depending on memory reference
        nop   //Penalty cycle
        sth   (r0+),r10      // *pA++ memory substitution (first time)
        ld    r11,(r1+)      // *pB++ memory reference (second time)
        nop   //Depending on memory reference
        nop   //Penalty cycle
        sth   (r0+),r10      // *pA++ memory substitution (second time)
        add   r14,1
        cmplt C6,r14,r15
[C6]    br    LOOP_TOP       // for branch process
```

Conversion (b) Intermediate code after dependence relaxation

> Relaxes the ambiguous memory dependence resulting from reading from the memory resource (r1+) when the memory resource (r0+) is written to

```
        mov   r14,0
        mov   r15,100
LOOP_TOP
        ld    r10,(r1+)   // *pB++ memory reference (first time)
        xor   r2,r1,r0    // Address range comparison process
        ld    r11,(r1+)   // *pB++ memory reference (second time)
        cmpeq C0,r2,0     // Address range comparison process
        cmpeq C1,r2,2     // Address range comparison process
[C0]    valn  r11,r10,11     // Overwrite bottom 16 bits with r10
[C1]    valn  r11,r11,10     // Overwrite top 16 bits with r10
        sth   (r0+),r10   // *pA++ memory substitution (first time)
        sth   (r0+),r11   // *pA++ memory substitution (second time)
        add   r14,1
        cmplt C6,r14,r15
[C6]    br    LOOP_TOP    // for branch process
```

FIG. 17A

Input source program (same object sizes)

```
void func(int * pA, int* pB)
{
            *pA++=*pB++;//(first time)
            *pA++=*pB++;//(second time)
            *pA++=*pB++;//(third time)
}
```

FIG. 17B

Ambiguous memory dependence resulting from reading from the memory resource (r1+) when the memory resource (r0+) is written to (a)

Intermediate code before dependence relaxation

| ld | r10,(r1+) | // *pB++ memory reference (first time) |
| nop | | //Depending on memory reference |
| nop | | //Penalty cycle |
| st | (r0+),r10 | // *pA++ memory substitution (first time) |
| ld | r11,(r1+) | // *pB++ memory reference (second time) |
| nop | | //Depending on memory reference |
| nop | | //Penalty cycle |
| st | (r0+),r11 | // *pA++ memory substitution (second time) |
| ld | r12,(r1+) | // *pB++ memory reference (third time) |
| nop | | //Depending on memory reference |
| nop | | //Penalty cycle |
| st | (r0+),r12 | // *pA++ memory substitution (third time) |

Conversion

Relaxes the ambiguous memory dependence resulting from reading from the memory resource (r1+) when the memory resource (r0+) is written to (b)

Intermediate code after one dependence relaxation

| | ld | r10,(r1+) | //*pB++ memory reference (first time) |
| | cmpeq | C0,r1,r0 | //Address comparison process |
| | ld | r11,(r1+) | //*pB++ memory reference (second time) |
| | st | (r0+),r10 | //*pA++ memory substitution (first time) |
| [C0] | mov | r11,r10 | //Correction command with yes/no executable flag |
| | st | (r0+),r11 | //*pA++ memory substitution (second time) |
| | ld | r12,(r1+) | //*pB++ memory reference (third time) |
| | st | (r0+),r12 | //*pA++ memory substitution (third time) |

PROGRAM RE-WRITING APPARATUS

BACKGROUND OF THE INVENTION (1) Field of the Invention

The present invention relates to a program re-writing apparatus which performs dependence relaxation for a command series including a memory access command in particular.

(2) Description of the Related Art

In recent years the processing speed of processors has substantially increased, however in comparison improvements in access speed for the main memory of a computer have been meager, and the speed difference between processors and the main memory continues to increase. Thus, it has been pointed out that conventionally, when high-speed information processing is performed by an information processing apparatus with a processor, memory access can become bottlenecked.

In order to solve this problem, one well-known method executes a load command necessary for a penalty cycle used for acquiring data stored in the memory region of the main memory, with as much priority over other commands as possible, and schedules commands such that other commands are executed during the penalty cycle. Thus, the effect of the penalty can be hidden in the execution cycle of other commands due to the memory access, and drops in performance can be prevented.

However in most cases, the memory access address value of a memory access command changes dynamically in static command scheduling. Thus memory dependence occurring during the memory access command period must be anticipated. This is known as ambiguous memory dependence. As a result, it is not possible to prioritize a load command over other memory access commands in static command scheduling, it becomes difficult to hide the penalty cycle due to the memory access command and the power of the processor cannot be taken advantage of.

Therefore, conventionally, when the processor does not have hardware which executes a special command, a load command cannot be shifted in front of the Store command for the memory region to perform command scheduling for the memory access command with an ambiguous memory dependence.

Speculative load commands are an example of a special command for addressing ambiguous memory dependence (see for example, Patent Document: U.S. Pat. No. 3,762,597 Publication (FIG. 6). A speculative load command is a command which executes the processes such as those below. In other words, the address of a memory region to be accessed by the load command is stored in a storage apparatus with special hardware and the memory data stored in the address is set in the register. Subsequently, when a store command is executed, the data stored in the register is set in the memory region. Further, when interference occurs between the address of the memory region accessed by the store command and the address of the speculative load command stored in the special storage apparatus above, data stored in the register by the store command is overwritten in the register which is set by the speculative load command. Thus, logical equivalency is maintained.

A speculative load command is explained in detail using FIG. 1, FIG. 2A and FIG. 2B.

For example, consider a processor which executes only a normal memory access command. FIG. 1 is a diagram which shows an example of a source program. FIG. 2A is a diagram which shows an example of an assembler file which is equivalent to the source program shown in FIG. 1 and does not include a speculative load command. In order to execute the memory access process shown in FIG. 1 with this kind of processor, an assembler file must be created which faithfully follows the memory access order shown in FIG. 2A.

On the other hand, FIG. 2B is a diagram which shows an example of an assembler file which is equivalent to the source program shown in FIG. 1 and includes a speculative load command. In this way, by utilizing the speculative load command, there is no longer a need to follow the memory access order shown in FIG. 1. In other words, the load command can be executed with priority over the store command. Thus the penalty cycle caused by memory referencing can be hidden in other commands and as a result the functionality of the program re-writing apparatus improves.

However, in order to execute this kind of speculative execution command, special hardware must be installed in the processor.

SUMMARY OF THE INVENTION

The present invention is realized in order to solve the problem above and has as an object providing a program re-writing apparatus which can relax ambiguous memory dependence without installing special hardware.

In order to achieve the objective above, the program re-writing apparatus according to the present invention is a program re-writing apparatus which re-writes an inputted program into a program for a processor for controlling whether or not a process is executed based on a yes or no execution flag, including: a comparison process insertion unit which inserts a comparison process into the inputted program, the comparison process comparing first address information, which is memory address information accessed by a first memory access process included in the inputted program, and second address information, which is address information of a memory accessed by a second memory access process included in the inputted program, and writing a comparison result into the yes or no execution flag; and a logic preservation process insertion unit which inserts a yes or no execution flag-attached logic preservation process into the inputted program, the yes or no execution flag-attached logic preservation process being a process executed based on a value of the yes or no execution flag and preserving the same result as a result of the inputted program when executed.

A logic preservation process is performed selectively based on the yes/no executable flag for preserving the logic of the memory access process. Thus, ambiguous memory dependence can be relaxed without installing special hardware. Thus, the memory access commands included in the processor can be scheduled efficiently and the processing speed of the program when the program is executed can be improved. Further, the efficiency of hardware use is improved.

Ideally, the first memory access process is a store process for writing data into the memory, and the second memory access process is a load process for reading data out of the memory.

Thus, load commands and store commands for the cache memory and external memory included in the processor can be scheduled statically and efficiently, and the processing speed of the program when the program is executed can be improved. Further, the efficiency of hardware use is improved.

Ideally, the program re-writing apparatus above further includes a critical path detection unit which detects a process which is a critical path from the inputted program; and an ambiguous memory dependence analysis unit which judges whether or not the first memory access process and the second memory access process are included in the critical path detected by the critical path detection unit, and when the first memory access process and the second memory access processes are included in the critical path, to analyze whether or not there is an ambiguous true memory dependence relationship between the first memory access process and the second memory access process, and the comparison process insertion unit inserts the comparison process into the first memory access process and the second memory access process which have been judged to be in an ambiguous true memory dependence relationship by the ambiguous memory dependence analysis unit.

Additionally, an ambiguous memory dependence relationship between commands in the critical pass can be automatically relaxed, the critical pass shortened efficiently, the commands scheduled and the processing speed when a program is executed can be improved. Further, the efficiency of hardware use is improved.

Ideally, the program re-writing apparatus further includes an execution sequence modification unit which modifies an execution sequence of the first memory access process and the second memory access process which have been judged to be in an ambiguous true memory dependence relationship by the ambiguous memory dependence analysis unit.

Thus the latency of a long command can be placed in priority and thus processing speed can be improved when the program is executed. Additionally, the efficiency of hardware use is improved.

Further, the program re-writing apparatus above further includes a data size comparison unit which judges whether or not a condition is satisfied, the condition being that the size of the data accessed once by the first memory access process and the size of the data accessed once by the second memory access process are equal, and the logic preservation process insertion unit, when it is judged by the data size comparison unit that the condition in the data size comparison unit is satisfied, inserts a process into the inputted program, the process in which the first memory access process overwrites a value read out of the memory by the second memory access process with a value written into the memory, as the logic preservation process.

Ideally, the comparison processing insertion unit inserts the comparison process one place before the logic preservation process as an execution sequence.

Thus, a match assessment can be realized once immediately prior to the memory comparison process performing before the memory access process and the processing speed of the program when executed can be improved.

Ideally, the program re-writing apparatus above further includes a regularity judgment unit which judges whether or not a condition is satisfied, the condition being that the first and the second memory access processes are consecutive, and that a memory address accessed in each memory access process is regularly renewed, and the comparison process insertion unit, when it is judged by the regularity judgment unit that the condition is satisfied, inserts the comparison process in a position before the logic preservation process, which is at the top of the sequence for the first and second memory access processes, as an execution sequence.

Alternatively, the program re-writing apparatus above further includes a data size comparison unit which judges whether or not a condition is satisfied, the condition being that a data size accessed once by the second memory access process is smaller than a data size accessed once by the first memory access process, and the logic preservation process insertion unit, when it is judged by the data size comparison unit that the condition is fulfilled, inserts a process into the inputted program as a logic preservation process, the process writing over a value read out of the memory by the second memory access process with a partial value written into the memory by the first memory access process.

Thus even an ambiguous memory dependence in memory access processes with varying object sizes, the memory dependence can be relaxed and the processing speed can be improved when the program is executed.

Ideally, the program re-writing apparatus above further includes an optimizing designation information addition unit which receives optimizing instruction information related to optimization, and the comparison process insertion unit and the logic preservation process insertion unit operate selectively based on the optimizing instruction information received by the optimizing designation information addition unit.

Thus the programmer can program keeping in mind a trade-off between code size for the scheduling for the memory access commands and execution performance.

Note that the present invention can not only be realized as a program re-writing apparatus which includes the characteristic units described above, but may be realized as a re-writing method which uses the characteristic units included in the program re-writing apparatus as characteristic steps, and as a program which executes the characteristic steps included in the program re-writing method in a computer. Additionally, it goes without saying that this kind of program can be distributed through recording media such as a CD-ROM and a network such as the Internet.

According to the present invention, ambiguous memory dependence can be relaxed without installing special hardware. Additionally, static and efficient scheduling for commands with ambiguous memory dependence can be achieved, and the processing speed when a program is executed can be improved. Further, the efficiency of hardware use is improved.

FURTHER INFORMATION ABOUT TECHNICAL BACKGROUND TO THIS APPLICATION

The disclosure of Japanese Patent Application No. 2007-139671 filed on May 25, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 1 is a diagram which shows an example of a source program for describing dependence relaxation;

FIG. 2A is a diagram which shows an example of an assembler file that does not include a speculative load command for describing dependence relaxation performed using speculative execution;

FIG. 2B is a diagram which shows an example of an assembler file that includes a speculative load command for describing dependence relaxation performed using speculative execution;

FIG. 10A through FIG. 10C are diagrams for describing the dependence relaxation process for the same object size access in a non-loop structure;

FIG. 11A through FIG. 11D are diagrams for describing the dependence relaxation process for differing object size access (small to big) in a non-loop structure;

FIG. 12A through FIG. 12D are diagrams for describing the dependence relaxation process for differing object size access (big to small) in a non-loop structure;

FIG. 13A through FIG. 13C are diagrams for describing the situation in which the comparison process is placed outside of the loop with the dependence relaxation process for the same object size access in the loop structure;

FIG. 14A through FIG. 14C are diagrams for describing the situation in which a comparison process is necessary in the loop with the dependence relaxation process for the same object size access in the loop structure;

FIG. 15A through FIG. 15B are diagrams for describing the dependence relaxation process for differing object size access (small to big) in a non-loop structure;

FIG. 16A through FIG. 16B are diagrams for describing the dependence relaxation process for differing object size access (big to small) in a loop structure;

FIG. 17A through FIG. 17C are diagrams for describing the dependence relaxation process for when the same object size access is consecutive in the non-loop structure.

DESCRIPTION OF THE PREFERRED EMBODIMENT(S)

Figure 3:
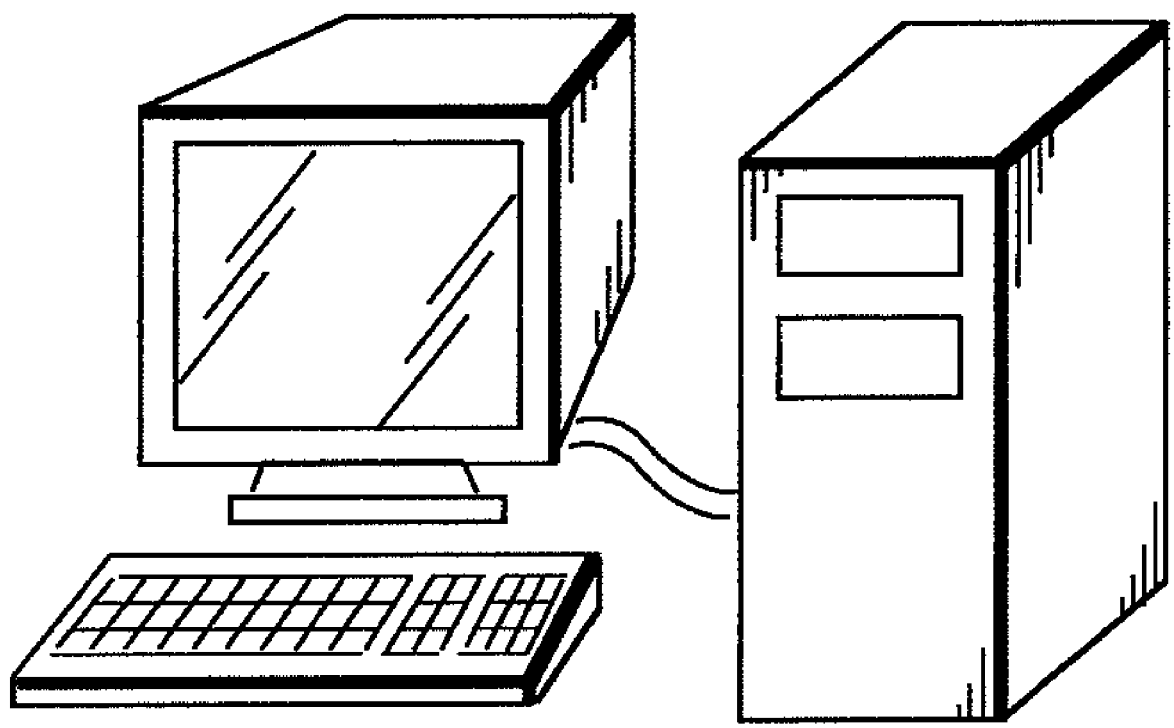
FIG. 3 is a diagram which shows an outside view of the structure of the compiler system according to the embodiment of the present invention.

FIG. 3 is a diagram which shows an outside view of the structure of the compiler system according to the embodiment of the present invention. The compiler system is realized by executing a variety of programs in the computer shown in FIG. 3.

Figure 4:
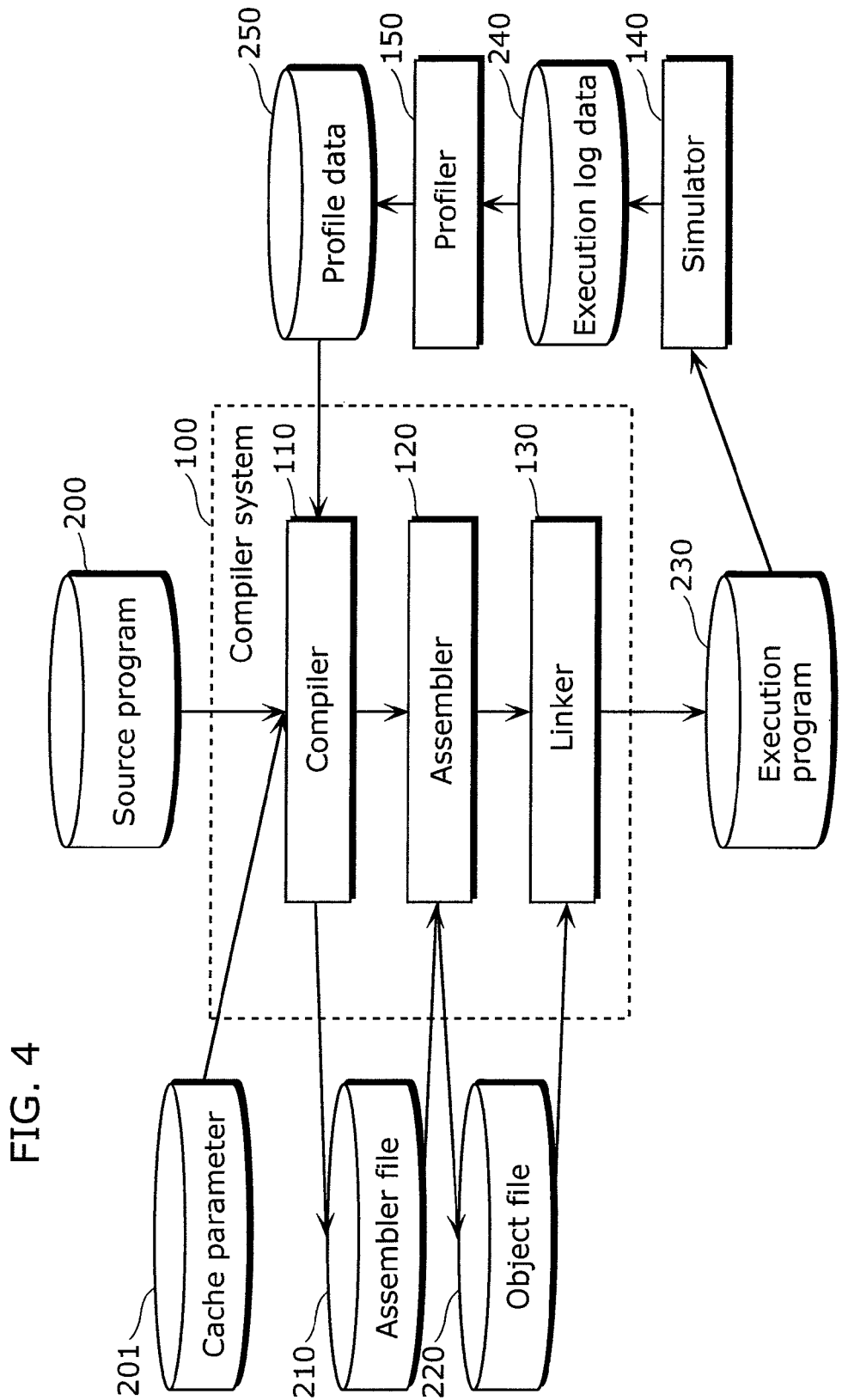
FIG. 4 is a diagram which shows the structure of the compiler system according to the embodiment of the present invention.

FIG. 4 is a diagram which shows the structure of the compiler system according to the embodiment of the present invention.

The compiler system 100 is a software system which converts the source program 200 written in high-level language such as C into an executable program 230 written in machine language and includes a compiler 110, an assembler 120 and a linker 130.

The compiler 110 is a target processor with a CPU that includes a yes or no execution flag register which can control whether or not a command is executed as a target processor and a program which converts the source program 200 into an assembler file 210 written in assembler language. When the compiler 110 converts the source program 200 into the assembler file 210, the compiler 110 performs an optimized process using the memory dependence relaxation optimizing unit and the command scheduling optimized unit, and outputs the assembler file 210.

The assembler 120 is a program which converts the assembler file 210 written in assembler language into an object file 220 written in machine language. The linker 130 is a program which combines plural object files 220 and generates an executable program 230. A simulator 140 and a profiler 150 are prepared as development tools for the executable program 230. The simulator 140 is a program which simulates the executable program 230 and outputs a variety of executable log data when the program is executed. The profiler 150 is a program which analyzes the executable log data 240 and outputs the profile data 250 for which the execution sequence and so on has been analyzed.

By executing the variety of programs on the computer, an executable program 230 is created using the source program 200.

[Structure of the Compiler]

Figure 5:
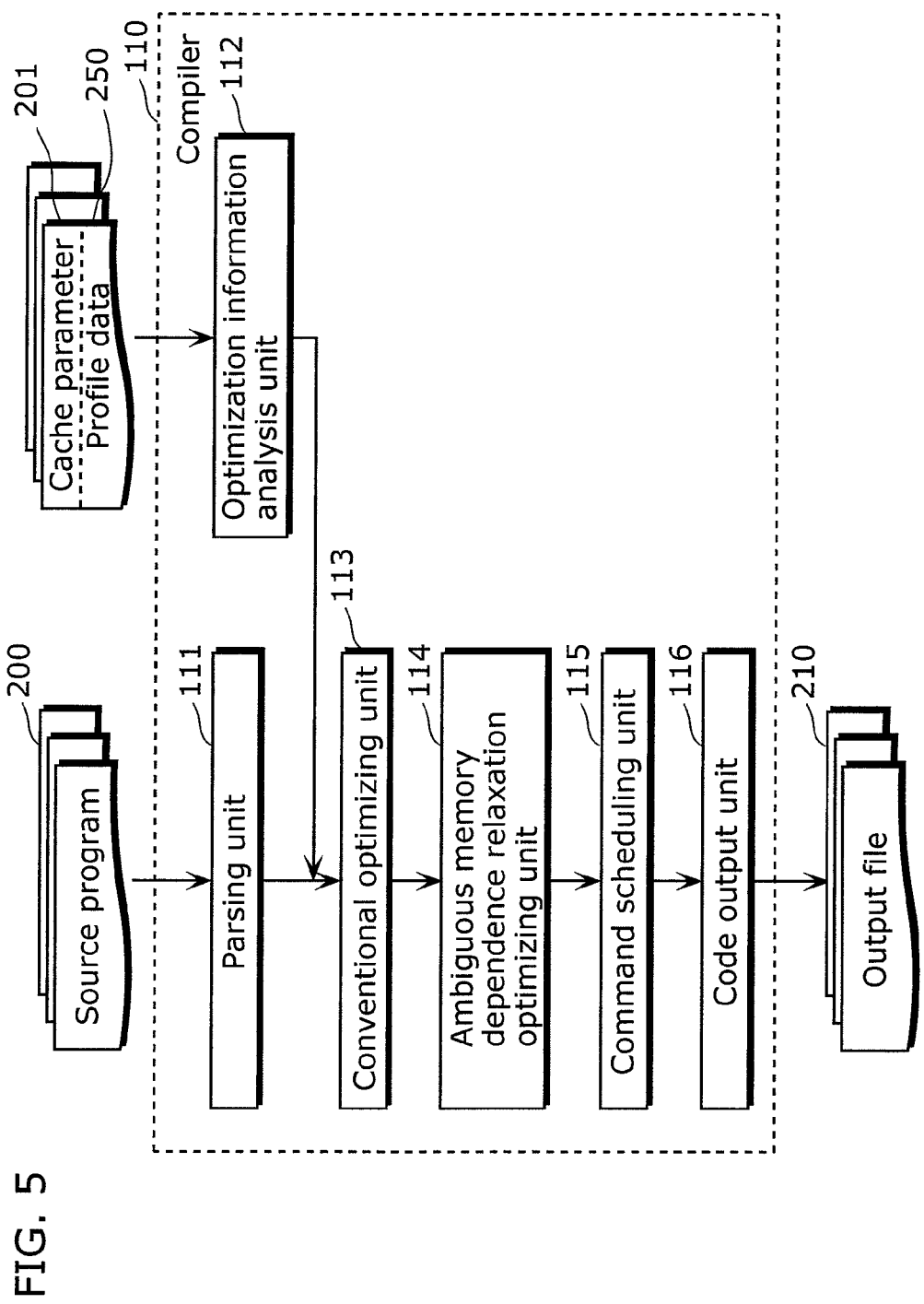
FIG. 5 is a diagram which shows the structure of the compiler.

FIG. 5 is a diagram which shows the structure of the compiler 110.

The compiler 110 includes a parsing unit 111, an optimized information parsing unit 112, a conventional optimization unit 113, an ambiguous memory dependence relaxation optimizing unit 114, a command scheduling unit 115 and a code output unit 116. Each structural processing unit is realized as a program executed on the computer.

The parsing unit 111 is a processing unit which outputs an intermediate language program (intermediate code) after receiving the source program 200 as input and performing the parsing process on the source program 200.

The optimized information analysis unit 112 is a processing unit which reads out information necessary for an optimizing process in intermediate code such as a cache parameter 201, profile data 250, a compiler option and a pragma. The compiler option and the pragma are both instructions for the compiler 110.

The conventional optimizing unit 113 is a processing unit which performs a conventional optimization process on the intermediate code.

The ambiguous memory dependence relaxation optimizing unit 114 is a processing unit which relaxes ambiguous memory dependence in a critical path.

The command scheduling unit 115 is a processing unit which optimizes the command line and performs command scheduling.

The code output unit 116 is a processing unit which converts the optimized intermediate code into assembler code written in assembler language and outputs the assembler file 210 including the assembler code.

[Process Flow]

Figure 6:
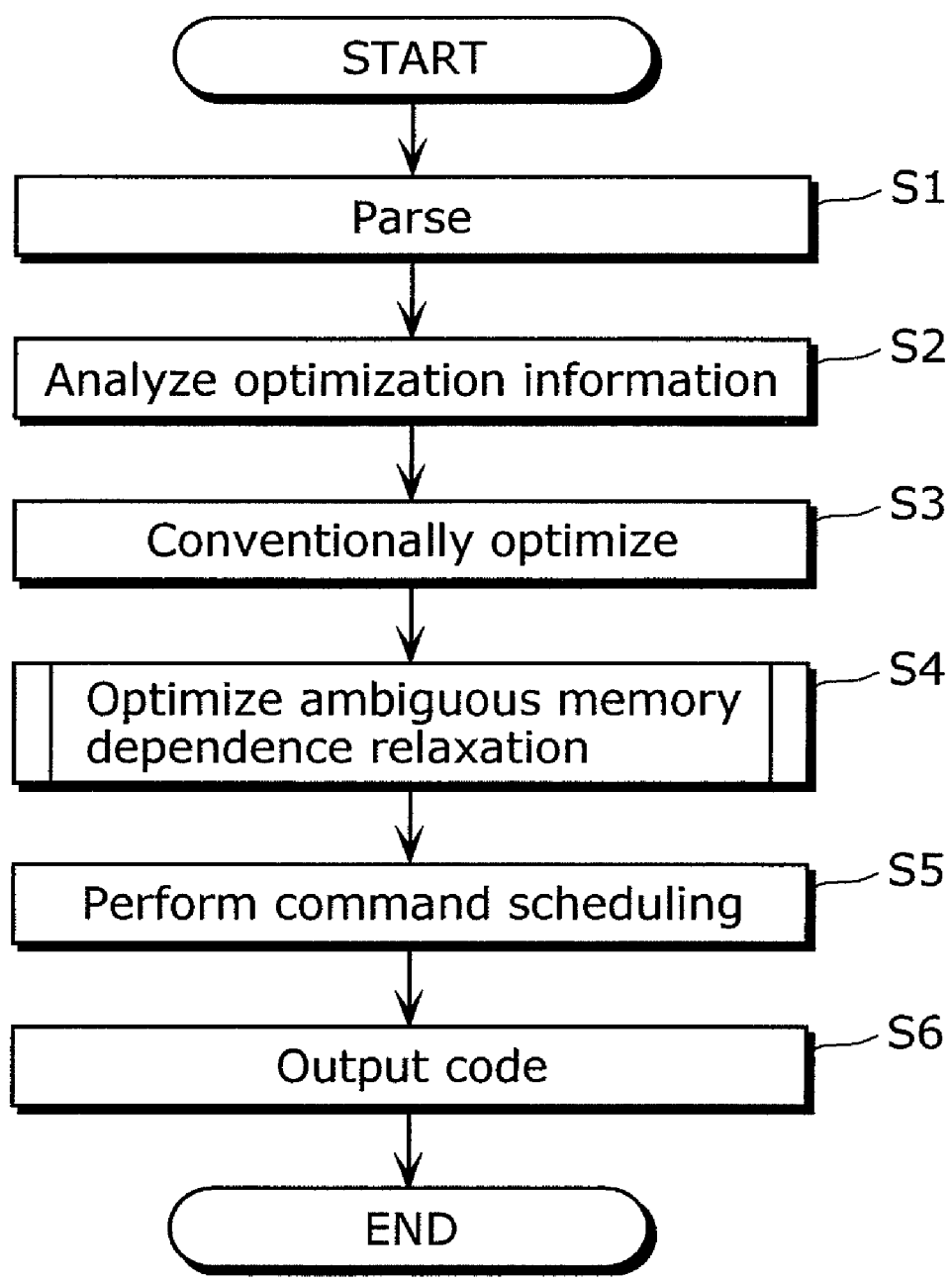
FIG. 6 is a flowchart showing the process executed by the compiler.

Next, the sequence of processes executed by the compiler 110 is described. FIG. 6 is a flowchart for the process executed by the compiler 110.

The parsing unit 111 performs the parsing process for the source program 200 and generates intermediate code (S1). The optimized information analysis unit 112 analyzes a cache parameter 201, profile data 250, a compiler option, a pragma and so on (S2). The conventional optimizing unit 113 conventionally optimizes intermediate code according to an analysis result in the optimization information analysis unit 112 (S3). The ambiguous memory dependence relaxation optimizing unit 114 focuses on the memory access process with ambiguous memory dependence on a critical path in the intermediate code, and if necessary, inserts a correction process and relaxes the ambiguous memory dependence (S4). The command scheduling unit 115 schedules the commands (S5). The code output unit 116 converts the intermediate code into assembler code and outputs the assembler code as an assembler file 210 (S6).

Since the parsing process (S1), the optimized information analysis program (S2), the conventional optimization process (S3), the command scheduling process (S5) and the assembler code output process (S6) are the same as conventional processes, detailed explanations of these processes are not repeated here.

A detailed explanation is provided for the ambiguous memory dependence relaxation optimizing process (S4).

Figure 7:
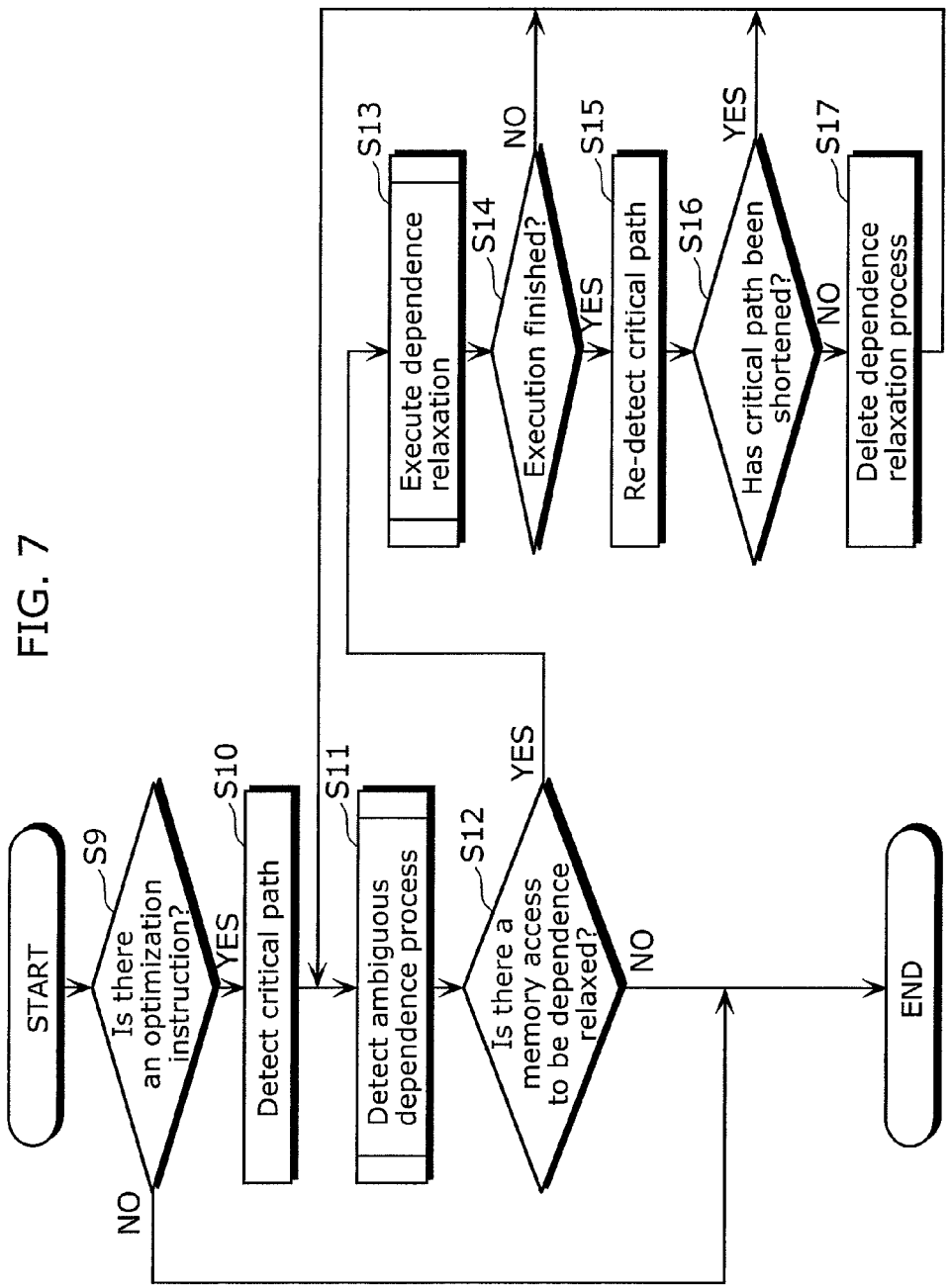
FIG. 7 is a detailed flowchart showing an ambiguous memory dependence relaxation optimized process.

FIG. 7 is a detailed flowchart describing the ambiguous memory dependence relaxation optimizing process (S4 in FIG. 6).

The ambiguous memory dependence relaxation optimizing unit 114 is activated when there is an optimization command provided by the compiler option or the pragma instruction and the like. When there is an instruction for optimization (YES in S9), the ambiguous memory dependence relaxation optimizing unit 114 receives intermediate code as input and detects a critical path (S10). When there is no instruction for optimization (NO in S9), the ambiguous memory dependence relaxation optimizing unit 114 finishes the process. The detection process for the critical path is the same as a conventional process and thus a detailed explanation is not repeated here. The critical path is a command string which takes the longest time to execute among command lines which generate by (possibly) defining or referencing a resource (register, memory, external port and so on) and which are linked by dependence. Note that a dependence generated based on the fact that there is a possibility of the material being defined or referenced is known as an ambiguous dependence. Generally, the critical path is found using a dependence graph known as a Directed Acylic Graph (DAG) made of elements known as nodes or edges. Here, a critical path can be found based on conventional graph theory which uses a command as a node, a dependence as an edge and a dependence distance (execution time between commands) as an edge distance.

The ambiguous memory dependence relaxation optimizing unit 114 detects a logically consecutive memory access process with ambiguous memory dependence in the detected critical path (S11). The ambiguous memory dependence relaxation process (S11) is described below.

When there is no consecutive memory access process with an ambiguous memory dependence relationship (NO in S12) to be optimized, the ambiguous memory dependence relaxation optimizing unit 114 finishes the process.

When there is a memory access process to be optimized (YES in S12), the ambiguous memory dependence relaxation optimizing unit 114 relaxes the ambiguous memory dependence in the detected memory access process (S13). The dependence relaxation process (S13) is described below.

The ambiguous memory dependence relaxation optimizing unit 114 assesses whether or not the ambiguous memory dependence relaxation has been performed (S14) and when the relaxation has not been able to be performed (NO in S14), an ambiguous memory dependence detection process described below (S11) is repeatedly performed for processes which follow the memory access process.

When the ambiguous memory dependence relaxation has been performed (YES in S14), the ambiguous memory dependence relaxation optimizing unit 114 detects a repeated critical path from the process which relaxes the ambiguous memory dependence (S15). The ambiguous memory dependence relaxation optimizing unit 114 determines whether or not the critical path length has been shortened after applying the optimizing process by comparing the total length of the re-detected critical path and the total length of the critical path before being processed (S16).

When it is determined that the critical path length has shrunk (YES in S16), the ambiguous memory dependence relaxation optimizing unit 114 recursively and repeatedly executes a process for relaxing ambiguous memory dependence for the shortened critical path (S11).

Whether the critical path length has not been shortened, or when the critical path length is the same (NO in S16), the ambiguous memory dependence relaxation optimizing unit 114 deletes the dependence relaxation process performed immediately prior (S17). In other words the dependence relaxation process performed immediately prior is not performed (S13). Subsequently, the ambiguous memory dependence relaxation optimizing unit 114 repeatedly performs the processes below in the ambiguous memory dependence relaxation (S11) for the processes which follow the memory access process.

A detailed explanation is provided for the ambiguous memory dependence detection process (S11) and the dependence relaxation process (S13).

Figure 8:
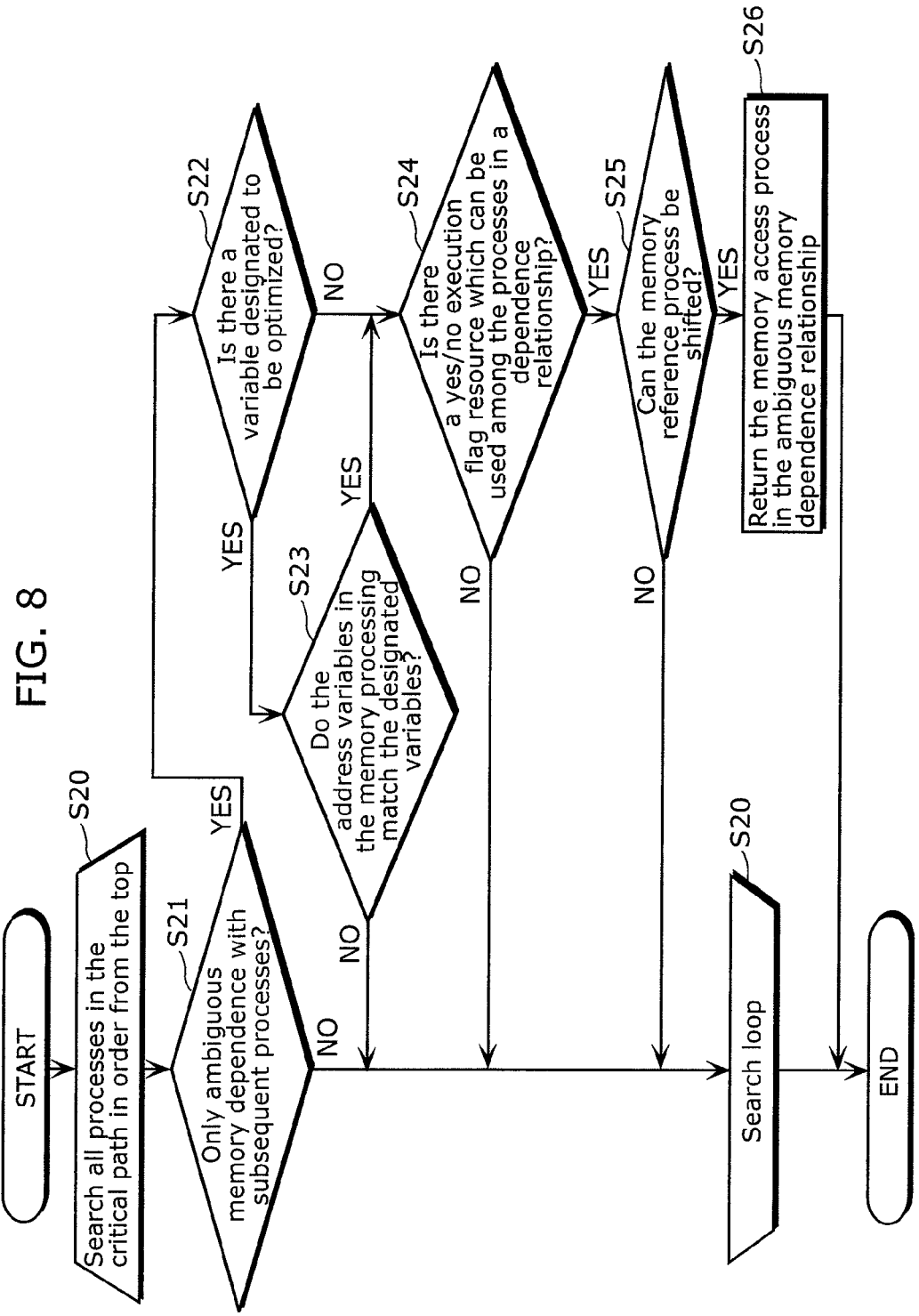
FIG. 8 is a detailed flowchart showing an ambiguous memory dependence detection process.

FIG. 8 is a detailed flowchart of the ambiguous memory dependence detection process (S11 in FIG. 7).

The ambiguous memory dependence relaxation optimizing unit 114 repeatedly executes the processes below (S20) while selecting commands in order from the top for the critical path detected in the critical path detection process (S10 in FIG. 7).

The process selected by the ambiguous memory dependence relaxation optimizing unit 114 is a memory access process, and the ambiguous memory dependence relaxation optimizing unit 114 judges only whether or not there is a process among the processes subsequent to the memory access processes which is in an ambiguous memory dependence relationship with the memory access process (S21).

When the selected process is not a memory access process or the selected process is a memory access process but there is no process among the processes following the memory access process which is only in an ambiguous dependence relationship for the memory access process (NO in S21), the ambiguous memory dependence relaxation optimizing unit 114 selects the next process (S20) and performs the same type of judgment (S21).

When the selected process is a memory access process, and when there is a process in only an ambiguous memory dependence on the memory access process among the processes following the memory access process (YES in S21), the ambiguous memory dependence relaxation optimizing unit 114 assesses whether or not the address variable name to be optimized is designated by a pragma or a compiler option (S22).

When the address variable name to be optimized is designated (YES in S22), the ambiguous memory dependence relaxation optimizing unit 114 assesses whether or not the address variable name for the memory access process to be optimized matches with the designated variable name (S23). When the variable names do not match (NO in S23), the ambiguous memory dependence relaxation optimizing unit 114 selects the next process (S20) and repeatedly executes the processes after S21.

When the variable names match (YES in S23), or when the address variable name to be optimized is not designated (NO in S22), the ambiguous memory dependence relaxation optimizing unit 114 assesses whether or not a flag register resource in the target processor is usable (S24). Since the assessment of whether or not the yes or no execution flag register resource can be used can be performed using living range analysis and so on used when conventionally optimizing the distribution of the register, a detailed explanation is not repeated here.

When there is no yes/no executability flag register that can be used among the memory access processes that are in the ambiguous memory dependence relationship (NO in S24), the next process is selected (S20) and the processes behind S20 are repeatedly executed.

When there is a yes/no executability flag register resource that can be used (YES in S24), the ambiguous memory dependence relaxation optimizing unit 114 assesses whether or not the memory reference command included in the memory access process in the ambiguous memory dependence relationship can be shifted in front of a memory substitution command (S25). In other words, the ambiguous memory dependence relaxation optimizing unit 114 analyzes whether or not the memory substitution command and the existing command are between the memory reference command and the memory substitution command, and when the memory substitution command the existing command are not between the memory reference command and the memory substitution command, the ambiguous memory dependence relaxation optimizing unit 114 judges that the memory reference command can be shifted, and when the memory substitution command the existing command are between the memory reference command and the memory substitution, the ambiguous memory dependence relaxation optimizing unit 114 judges that the memory reference command can be shifted. When the memory reference command cannot be shifted (NO in S25), the ambiguous memory dependence relaxation optimizing unit 114 selects the next process (S20) and repeatedly executes the processes after S21.

When the memory reference command can be shifted (YES in S25), the ambiguous memory dependence relaxation optimizing unit 114 returns the memory access process which is in an ambiguous memory dependence relationship detected in S21 (returning the memory access process as a return value) (S26). Even when all of the processes have finished being searched for, and there is no memory access process to be optimized, the ambiguous memory dependence relaxation optimizing unit 114 finishes the search loop (S20), and finishes the ambiguous memory dependence process detection.

Figure 9:
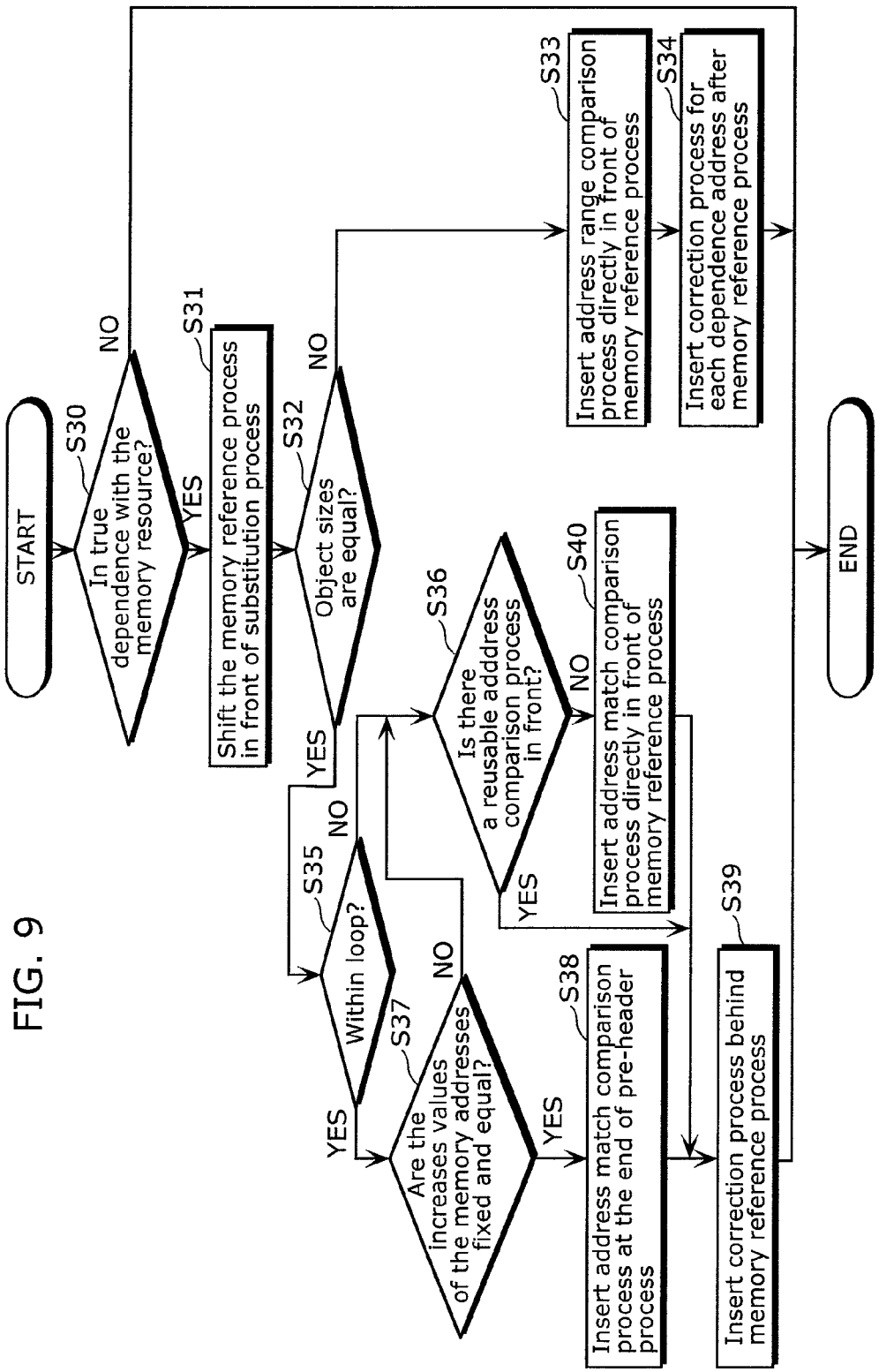
FIG. 9 is a detailed flowchart showing an ambiguous memory dependence relaxation process.
Figure 11D:
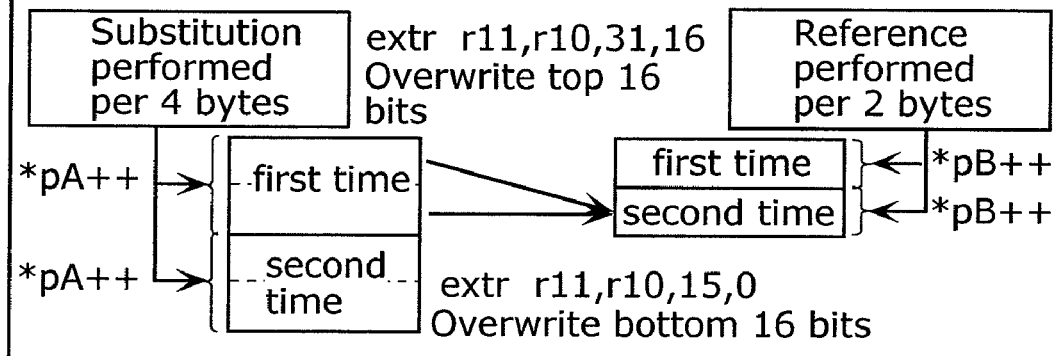
Figure 12D:
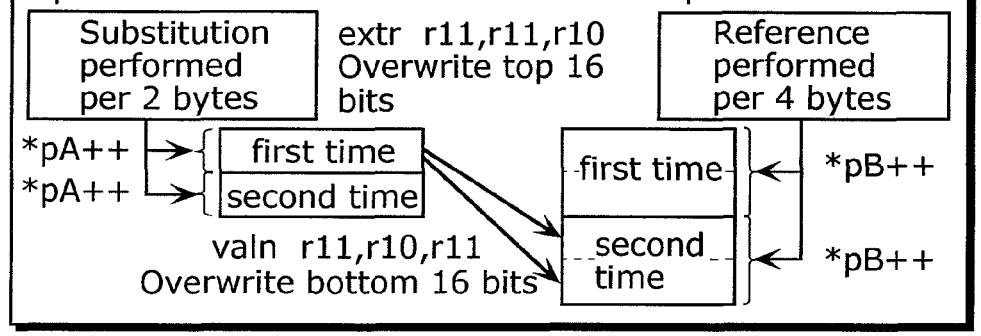

FIG. 9 is a detailed flowchart of a dependence relaxation process (S13 in FIG. 7).

The ambiguous dependence relaxation optimizing unit 114 determines whether or not the memory access process detected in the ambiguous memory dependence detection process (S11 in FIG. 7, FIG. 8) is in ambiguous true memory dependence (S30).

When the memory access process is not in an ambiguous true memory dependence (NO in S30), the ambiguous memory dependence relaxation optimizing unit 114 finishes the process. When the memory access process is in an ambiguous true memory dependence (YES in S30), the ambiguous memory dependence relaxation optimizing unit 114 shifts the load process for the data stored in the memory directly in front of the store process (S31) and determines whether or not the memory region sizes (object size) for the memory access processes in the dependence relationship are equal in size to the load data (S32).

When the object sizes differ (NO in S32), the ambiguous memory dependence relaxation optimizing unit 114 inserts a comparison process for comparing the ranges of the address register values in the memory access process directly in front of the loading process (S33), inserts a correction process for each address depending on the result of the address range comparison process after the loading process (S34) and finishes the process.

The comparison process for comparing the range of the address register values (S33) is performed as described below. The mutual memory access processes are APb and APs. Additionally, the memory access addresses for APb and APs are AAb and AAs respectively. Further, the memory access region sizes for APb and APs are ASb and ASs. Additionally, the greatest common denominator (gcd) for ASb and ASs (ASb, ASs) is GAS, and when ASb>ASs, the number of comparisons n is ASb/GAS and in the process, the n comparisons below (AAb+GAS*0==AAs, AAb+GAS*1==AAs, AAb+GAS*2==AAs, . . . , AAb+GAS*(n−1)==AAs) are performed. Thus the ambiguous dependence relaxation optimizing unit 114 detects the dependence memory region. In other words, when the comparison result AAb+GAS*k==AAs is true, and ASb>ASs, the region GAS*k bytes away from the top access address AAb in the memory region accessed by APb, and the memory region accessed by APs are in a dependence relationship.

The correction process for each address (S34) is a process which inserts a substitution process with a yes or no execution flag after the loading process, the yes or no execution flag-attached substitution process overwriting only the region portion corresponding to the dependence memory region in data stored in the store process to the data substituted in the load process for each result of a comparison process which compares the range of the address register values (S33).

When the object size is the same (YES in S32), the ambiguous memory dependence relaxation optimizing unit 114 determines whether or not the memory access process in the ambiguous memory dependence relationship is a process in the loop (S35). When the process is not in the loop (NO in S35), the ambiguous memory dependence relaxation optimizing unit 114 assesses whether or not the address comparison process generated when the other ambiguous memory dependence is relaxed can be diverted (S36). During the determination, when the address variables match and the fluctuation values for the address variables in the loading process are equal (YES in S36), the ambiguous memory dependence relaxation optimizing unit 114 diverts the address comparison process and skips the insertion process for the address comparison process (S40). On the contrary, when there is no address comparison process in the assessment in S36, or the address variables do not match, or when there is a possibility that the fluctuation values for the address variable are not equal (NO in S36), the ambiguous memory dependence relaxation optimizing unit 114 inserts the address match comparison process directly in front of the load process (S40).

When the two memory access processes are within the loop (YES in S35), it is assessed whether or not the increased value by which the memory addresses change in the loop process are fixed and equal (S37). When the increase value of the memory address are not mutually fixed, or are not equal (NO in S37), the insertion process for the address match comparison process is performed (S36, S40) in the same way as when the memory access process is not a process within the loop (NO in S35).

When the increased values of the memory addresses are fixed and equal (YES in S37), the ambiguous memory dependence relaxation optimizing unit 114 inserts an address match comparison process at the tail-end of a pre-header process, which is the only preceding loop process (S38). After the ambiguous memory dependence relaxation optimizing unit 114 inserts each comparison process (S38, S40), a substitution process with a yes/no executable flag for over-writing data substituted in the loading process atop data stored in the store process is inserted after the loading process (S39) and the process is finished.

[Compile Option]

In the compiler system 100, the option "-fno-cut-ambiguous-depend" is provided as a compiling option for the compiler. Regardless of the pragma designation, when the compiler is executed and this option is designated, the compiler system 100 does not optimize relaxation for the ambiguous memory dependence. When there is no designation for this option, the compiler system 100 adheres to whether or not there is a "-O" (an optimizing command line option designation), in the same way as conventional optimization.

[Pragma Designation]

The present designation is made for an immediately subsequent loop.

When variables are designated using the pragma "#pragma_cut_ambiguous_depend [variable name, variable name]", the compiler system 100 performs ambiguous memory dependence relaxation optimizing focusing on only the address variable designated by the pragma. The variable designated may be an array or a pointer. When the variable designation is abbreviated, the compiler system 100 performs ambiguous memory dependence relaxation optimizing on all of the memory access.

Below, the ambiguous memory dependence relaxation process is described for several specific phases. Note that in the description of the process following, the program is written in quasi-assembler language in order to simplify the explanation, and the optimization process is actually performed by an intermediate language.

[Non-Loop Structure, Same Object Size Access]

FIG. 10A through FIG. 10C are diagrams for describing the dependence relaxation process for the object size access which is the same as the non-loop structure.

FIG. 10A is a diagram which shows an example of the source program 200 for the same object size access in the non-loop structure.

The process content of the source program 200 is a process which uses arguments pA and pB in a function as a base address, and substitutes a region value indicated by pB for a region value indicated by pA, and the process which adds the address value such that the addresses pA and pB respectively show the following elements continues twice. The memory region size substituted at the address variable pA (store object size) and the memory region size referenced at the address variable pB (load object size) are the same since the mutual address variables are of the same type.

FIG. 10B(a) shows that the source program 200 is inputted into the compiler process shown in FIG. 6 and the source program 200 is an intermediate code converted from S1 to S3 in FIG. 6 as input into S4. A critical path shown in FIG. 10C(a) is detected in the critical path detection process (S10 in FIG. 7) using the inputted intermediate code (FIG. 10B(a)). Since the memory substitution process according to *pA++ the first time and the memory reference process according to *pB++ the second time have an ambiguous memory dependence, the critical path becomes a process flow including a series of processes: memory reference according to *pB, memory substitution according to *pA the first time, memory reference according to *pB and memory substitution according to *pA the second time.

An ambiguous memory dependence detection process (S11 in FIG. 7, FIG. 8) is executed for the critical path. In other words, the ambiguous memory dependence relaxation optimizing unit 114 searches for a process in the critical path from the top (S20 in FIG. 8) and detects an ambiguous memory dependence in the memory substitution process according to *pA++ the first time and the memory reference process according to the second pB++ (S21 in FIG. 8). Thus S21 in FIG. 8 moves to YES.

Since the yes/no executable flag is not used in the intermediate code into which the yes/no executable flag is inputted, there is a yes/no executable flag register resource that can be used freely. Thus S24 in FIG. 8 moves to YES.

A register r1 and r11 besides the memory necessary for memory dependence in the memory reference process is considered in a yes/no shiftable assessment process in the memory reference process (S25). Although the register r1 and r11 may respectively depend on other processes, there is no dependence between the memory substitution process and the memory reference process according to the definition or reference of the registers r1 and r11. Thus, since the memory reference process can be shifted, S25 in FIG. 8 moves to YES.

Thus the memory substitution process according to *pA++ the first time and the memory reference process according to *pB++ the second time are judged to be in an ambiguous memory dependence relationship and information about the dependence relaxation process (S13 in FIG. 7) memory access process is provided to the dependence relaxation process (S13 in FIG. 7) which is YES in S12 in FIG. 7. The dependence is relaxed for the memory access which has an ambiguous memory dependence (S13 in FIG. 7, FIG. 9).

The ambiguous memory dependence in the memory access process obtained is a reference to the memory using the definition for the memory according to *pA++ the first time and *pB++ the second time, and is a true dependence relationship. As a result, S30 in FIG. 9 is YES, and the ambiguous memory dependence relaxation optimizing unit 114 shifts the memory reference process according to *pB the second time as in FIG. 10B(b) in front of the memory substitution process according to *pA the first time (S31 in FIG. 9). Since the store object size according to pA in the memory access process and the load object size according to pB are equal, S32 in FIG. 9 is YES and further S35 in FIG. 9 is NO since the memory access processes are not loop processes.

When S35 in FIG. 9 is NO, there is no prior existing address comparison process. Thus S36 in FIG. 9 is NO, and the ambiguous memory dependence relaxation optimizing unit 114 inserts the address comparison process which performs comparison to find whether or not there is a match between a value of the register r1 distributed to the address variable pB and the value of the register r0 distributed to the address variable pA (S40 in FIG. 9). Note that when the values of r1 and r0 in the address comparison process "cmpeq C0, r1, r0" shown in FIG. 10B(b) are equal, a yes/no condition flag c0 is substituted.

Finally, in order to correctly preserve the logic when there is actual dependence during the ambiguous memory dependence, the ambiguous memory dependence relaxation optimizing unit 114 inserts a correction command with a yes/no executable flag after the memory reference process according to the shifted *pB (39 in FIG. 9) such that r11, the value obtained in the memory reference process when the addresses match according to *pB according to the yes or no execution flag register, is overwritten atop the value r10 which is substituted in the memory substitution process according to *pA. In the yes or no execution flag-attached correction command shown in FIG. 10B(b), when C0==1, in other words when the values of r1 and r0 are equal, the command 'mov' is executed.

In this way the dependence relaxation in the dependence relaxation process (S13 in FIG. 7) is performed. Thus, S14 in FIG. 7 is YES and when the critical path for the dependence relaxed intermediate code is re-detected (S15 in FIG. 7), the critical path includes only the true dependence between the memory reference according to *pB the first time, the correction command with yes/no executable flag and the memory substitution process by *pA. In other words, when the latency according to the memory reference process is 3 cycles, the length of the critical path is from 7 cycles in FIG. 10C(a) to 4 cycles in FIG. 10C(b). Thus S16 in FIG. 7 is YES and S11 in FIG. 7 is executed recursively. In this example, since all of the ambiguous memory dependence is eliminated, the memory access for which the dependence is relaxed is not detected in the ambiguous memory dependence detection process the second time (S11 in FIG. 9). Thus, S12 in FIG. 7 is NO, and the ambiguous memory dependence relaxation optimizing unit 114 ends the process.

In this way, by performing an ambiguous memory dependence relaxation process (FIG. 7, S4 in FIG. 6) and shortening the critical path, a more powerful intermediate code can be realized using a command scheduling process (S5 in FIG. 6), and an object code is generated and the compiling process finished during the assembler code output process (S6 in FIG. 6).

[Non-Loop Structure/Differing Object Size Access (Small→Large)]

FIG. 11A through FIG. 11D are diagrams for describing the dependence relaxation process for the object size access which varies in the non-loop structure (small→large: the memory access size being smaller than the second memory access the first time).

FIG. 11A is a diagram which shows an example of the source program 200 having a varying object size access in the non-loop structure.

The process content of the source program 200 performs a process twice, the process using arguments pA and pB of the function as a base address, substitutes the region value indicated by pB for the region value indicated by pA, and adds the address values pA and pB such that the following respective elements are shown. The memory region size substituted at the address variable pA (store object size) and the memory region size referenced at the address variable pB (load object size) are respectively 4 bytes and 2 bytes and thus the store object size is larger than the load object size. FIG. 11B(a) shows that the source program 200 is inputted into the compiler process shown in FIG. 6, and is an intermediate code converted from S1 to S3 in FIG. 6 as input into S4. A critical path as shown in FIG. 11C(a) is detected in the critical path detection process (S10 in FIG. 7) using the inputted intermediate code (FIG. 11B (a)). Since the memory substitution process according to *pA++ the first time and the memory reference process according to *pB++ the second time have an ambiguous memory dependence, the critical path becomes a process flow including a series of processes: memory reference according to *pB the first time, memory substitution according to *pA, memory reference according to *pB the second time and memory substitution according to *pA.

An ambiguous memory dependence detection process (S11 in FIG. 7, FIG. 8) is performed for the critical path. In other words, the ambiguous memory dependence relaxation optimizing unit 114 searches for a process in the critical path from the top (S20 in FIG. 8) and detects an ambiguous memory dependence between the memory substitution process according to *pA++ the first time and the memory reference process using the *pB++ the second time (S21 in FIG. 8). Thus S21 in FIG. 8 moves to YES.

Since the intermediate code into which the yes/no executable flag is inputted is not used, there is a yes/no executable flag register resource which can be used freely. Thus S24 in FIG. 8 moves to YES.

The registers r1 and r11 besides the memory necessary for ambiguous memory dependence in the memory reference process are considered when performing a yes/no shiftable assessment process in the memory reference process (S25). There may be other processes besides the register r1 and r11, however in this case there is no dependence according to the definition or reference of the registers r1 and r11 between the memory substitution process and the memory reference process. Thus, since the memory reference process can be shifted, S25 in FIG. 8 moves to YES.

Thus in S26 in FIG. 8, the memory substitution process according to *pA++ the first time and the memory reference process according to *pB++ the second time are judged to be in an ambiguous memory dependence relationship, and information about the memory access process is passed to the dependence relaxation process (S13 in FIG. 7) for which S12 in FIG. 7 is YES. The dependence is relaxed for the memory access process having an ambiguous memory dependence (S13 in FIG. 7, FIG. 9).

The ambiguous memory dependence in the obtained memory access process is a definition of the memory according to *pA++ the first time and a reference to the memory according to *pB++ the second time and is in a true dependence relationship due to the memory. Thus, S30 in FIG. 9 is YES, and the ambiguous memory dependence relaxation optimizing unit 114 shifts the memory reference process according to *pB the second time prior to the memory substitution process using the *pA the first time as in FIG. 11B (b). Since the store object size according to pA in the memory access process and the load object size according to pB are different, S32 in FIG. 9 is NO.

Thus S32 in FIG. 9 is NO, and the ambiguous memory dependence relaxation optimizing unit 114 inserts the address range comparison process directly prior to the memory reference process (S33 in FIG. 9). The address range comparison process is found using the process below. In other words, since the store object size according to pA and the load object size according to pB are respectively 4 bytes and 2 bytes, the greatest common denominator (gcd) of the sizes is found to be 2 and the number of comparisons is found to be 4 bytes/gcd (4 byte, 2 byte). Additionally, since the register to which the address variable pB has been allocated is r1 and the register to which the address variable pA has been allocated is r0, a process for comparing the two address matches r0==r1+2*0 and r0==r1+2*1 is needed. The ambiguous memory dependence relaxation optimizing unit 114 inserts the needed address range comparison process directly prior to the memory reference process (S33 in FIG. 9). In the intermediate code in FIG. 11B(b), an XOR operation for both addresses is taken in order to efficiently perform the comparison process, and a comparison process is performed to find whether or not the result is or whether both addresses diverge by 2 bytes.

Finally, in order to correctly preserve the logic when there is actual dependence in the ambiguous memory dependence, the ambiguous memory dependence relaxation optimizing unit 114 inserts a correction command with a yes/no executable flag behind the memory reference process according to the shifted *pB (S34 in FIG. 9) the value r10 which has been substituted by the memory substitution process according to *pA is overwritten over a portion of the data corresponding to a memory region where there is a dependence in r11, which is the value obtained by the memory reference process according to *pB according to the yes or no execution flag register when the addresses match. In the intermediate code in FIG. 11B(b), the ambiguous memory dependence relaxation optimizing unit 114 code expands the 16 bits from the 0$^{th}$ bit to the 15$^{th}$ bit in r10 into r11 as "extr r11, r10, 15, 0" when there is a dependence in the bottom 16 bits, as in the memory image of the correction process in FIG. 11D. When there is a dependence in the top 16 bits, the ambiguous memory dependence relaxation optimizing unit 114 code expands the 16 bits from the 16$^{th}$ bit in r10 to the 31$^{st}$ bit in r10 into r11 as "extr r11, r10, 31, 16". The necessary code expansion must be coordinated with the memory reference command function in r11. In this case, since the ldh process is anticipated to not only code expand the 16 bit data in the memory into 32 bit data, but also substitute the 16 bit data for the 32 bit data in the register, it is also anticipated that the ldh process must perform code expansion on the correction process and that the correction process is also code expanded in the extr process.

In this way, the dependence relaxation in the dependence relaxation process (S13 in FIG. 7) is performed. Thus, S14 in FIG. 7 is YES and when the critical path for the dependence-relaxed intermediate code is re-detected (S15 in FIG. 7), the critical path includes only a true dependence between the memory reference according to *pB the first time, the correction command with a yes/no executable flag and the memory substitution process according to *pA. In other words, when the latency according to the memory reference process is 3 cycles, the length of the critical path is shortened from 7 cycles in FIG. 11C(a) to 4 cycles in FIG. 11C(b). Thus S16 in FIG. 7 is YES, and S11 in FIG. 7 is executed recursively. In this example, since all of the ambiguous memory dependence is eliminated, the memory access for which the dependence is relaxed is not detected in the ambiguous memory dependence detection process the second time (S11 in FIG. 9). Thus, S12 in FIG. 7 is NO, and the ambiguous memory dependence relaxation optimizing unit 114 ends the process.

In this way, by performing an ambiguous memory dependence relaxation process (FIG. 7, S4 in FIG. 6) and shortening the critical path even when the sizes for memory access differ, a higher-powered intermediate code can be achieved using the command scheduling process (S5 in FIG. 6), an object code is generated and the compiling process is finished during the assembler code output process (S6 in FIG. 6).

[Non-Loop Structure/Differing Object Size Access (Large→Small)]

FIG. 12A through FIG. 12D are diagrams for describing the dependence relaxation process for the varying object sizes (big→small: the memory access size for the first time is larger than the memory access size for the second time) in the non-loop structure.

FIG. 12A is a diagram which shows an example of the source program 200 with differing object size accesses in the non-loop structure.

The process content of the source program 200 is a process performed twice consecutively using arguments pA and pB in the function as base addresses, which substitutes the region value indicated by pB for the region value indicated by pA, and adds the address values pA and pB such that the following respective elements are shown. The memory region size substituted at the address variable pA (store object size) and the memory region size referenced at the address variable pB (load object size) are respectively 2 bytes and 4 bytes and thus the load object size is larger than the store object size.

FIG. 12B(a) shows that the source program 200 is intermediate code which is inputted into the compiler process shown in FIG. 6, converted in the process from S1 to S3 in FIG. 6 and inputted at S4. A critical path as shown in FIG. 12C(a) is detected as shown in the critical path detection process (S10 in FIG. 7) using the inputted intermediate code (FIG. 12B (a)). Since the memory substitution process according to *pA++ the first time and the memory reference process according to *pB++ the second time have an ambiguous memory dependence, the critical path is a process flow including a series of processes: memory reference according to *pB the first time, memory substitution according to *pA, memory reference according to *pB the second time and memory substitution according to *pA.

An ambiguous memory dependence detection process (S11 in FIG. 7, FIG. 8) is performed for the critical path. In other words, the ambiguous memory dependence relaxation optimizing unit 114 searches the processes in the critical path from the top (S20 in FIG. 8), and detects an ambiguous memory dependence in the memory dependence process according to *pA++ the first time and in the memory reference process according to *pB++ the second time (S21 in FIG. 8). Thus S21 in FIG. 8 is YES.

Since the intermediate code into which the yes/no executable flag is inputted is not used, there is a yes/no executable flag register resource that can be used freely. Thus, S24 in FIG. 8 is YES.

The registers r1 and r11 besides the memory necessary for ambiguous memory dependence in the memory reference process are considered in the yes/no shiftable assessment process in the memory reference process (S25). There may be other processes besides those of the register r1 and r11, however in this case there are no processes according to the definition or reference of the registers r1 and r11 between the memory substitution process and the memory reference process. Thus, S25 in FIG. 8 is YES since the memory reference process can be shifted.

Thus, in S26 in FIG. 8, the memory substitution process according to *pA++ the first time and the memory reference process according to *pB++ the second time are judged to be in an ambiguous memory dependence relationship, thus S12 in FIG. 7 is YES and information about the memory access process is passed to the dependence relaxation process (S13 in FIG. 7). The dependence is relaxed for the memory access process with an ambiguous memory dependence (S13 in FIG. 7, FIG. 9).

The ambiguous memory dependence in the obtained memory access is a definition for the memory according to *pA++ the first time and a reference to the memory according to *pB++ the second time and is in a true dependence relationship according to the memory. Thus, S30 in FIG. 9 is YES, and the ambiguous memory dependence relaxation optimizing unit 114 shifts the memory reference process according to *pB the second time in front of the memory substitution process according to *pA the first time (S31 in FIG. 9) as in FIG. 12B(b). Since the store object size according to pA and the load object size according to pB in the memory access process vary, S32 in FIG. 9 is NO.

Thus when S32 in FIG. 9 is NO, the ambiguous memory dependence relaxation optimizing unit 114 inserts the address range comparison process directly in front of the memory reference process (S33 in FIG. 9). The address range comparison process is found using the process below. In other words, since the store object size according to pA and the load object size according to pB are respectively 2 bytes and 4 bytes, the greatest common denominator of the sizes is found to be 2 and the number of comparisons is found to be 4 bytes/gcd (4 bytes, 2 bytes). Additionally, since the register to which the address variable pB has been allocated is r1 and the register to which the address variable pA has been allocated is r0, a process for comparing in order to find whether the two addresses match, r1==r0+2*0 and r1==r0+2*1, is needed. The ambiguous memory dependence relaxation optimizing unit 114 inserts the address range comparison needed as above directly prior to the memory reference process (S33 in FIG. 9). In order to efficiently perform a comparison process in the intermediate code in FIG. 12B(b), an XOR operation for both addresses is taken, and a comparison process is performed to find whether or not the result is 0 or whether both addresses diverge by 2 bytes.

Finally, in order to correctly preserve the logic when there is actual dependence in the ambiguous memory dependence, the ambiguous memory dependence relaxation optimizing unit 114 inserts a correction command with a yes/no executable flag behind the memory reference process according to the shifted *pB (S34 in FIG. 9) such that a data portion corresponding to a memory region portion in which there is a dependence in r10, which is the value substituted in the memory substitution process according to *pA, is overwritten atop r11, which is the value obtained by the memory reference process according to *pB using the yes or no execution flag register when the addresses match. When there is a dependence in the bottom 16 bit portion in the intermediate code in FIG. 12B(b), as in the memory image of the correction process in FIG. 12D, the ambiguous memory dependence relaxation optimizing unit 114 overwrites the bottom 16 bits in r10 atop the bottom 16 bits of r11 as "vain r11, r10, r11". Additionally, when there is a dependence in the top 16 bit portion, the ambiguous memory dependence relaxation optimizing unit 114 overwrites the top 16 bits in r11 onto the top 16 bits of "valn r11, r10, r11".

In this way, the dependence relaxation in the dependence relaxation process (S13 in FIG. 7) is performed. Thus, S14 in FIG. 7 is YES and when the critical path for the intermediate code after dependence relaxation is re-detected (S15 in FIG. 7), the critical path includes only the true dependence between the memory reference according to *pB the first time, the correction command with a yes/no executable flag and the memory substitution process according to *pA as shown in FIG. 12C(b). In other words, when the latency according to the memory reference process is 3 cycles, the length of the critical path is shortened by 3 cycles from the 7 cycles in FIG. 12C(a) to the 4 cycles in FIG. 12C(b). Thus S16 in FIG. 7 is YES and S11 in FIG. 7 is executed recursively. In this example, since all of the ambiguous memory dependence is eliminated, the memory access for which the dependence is relaxed is not detected in the ambiguous memory dependence detection process the second time (S11 in FIG. 9). Thus, S12 in FIG. 7 is NO, and the ambiguous memory dependence relaxation optimizing unit 114 ends the process.

In this way, by performing an ambiguous memory dependence relaxation process (FIG. 7, S4 in FIG. 6) and shortening the critical path even when the sizes for memory access differ, a higher-powered intermediate code can be achieved using a command scheduling process (S5 in FIG. 6); an object code is generated and the compiling process is finished in the assembler code output process (S6 in FIG. 6).

[Assessment Inside and Outside the Loop Structure]

Figure 13C:
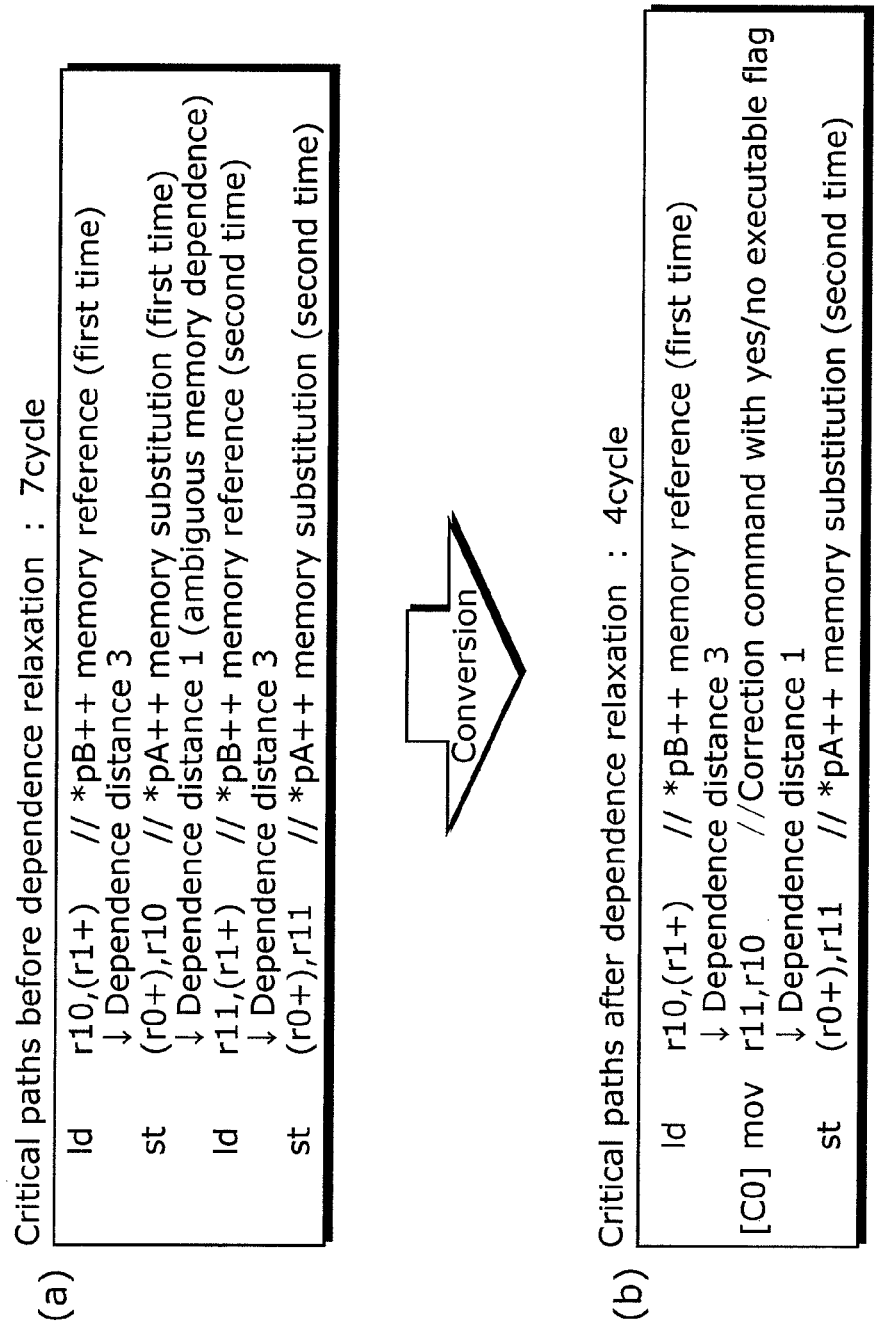

FIG. 13A through FIG. 13C are diagrams for describing a case in which the comparison processing can be put outside the loop using the dependence relaxation process for the same object size access in the loop structure.

FIG. 13A is a diagram which shows an example of the source program 200 in the loop structure.

The process content of the source program 200 is repeated 100 times and includes a process which substitutes the region value indicated by pB for the region value indicated by pA using arguments pA and pB in the function as base addresses, and a process performed twice consecutively which adds the address values pA and pB such that the following respective elements are shown in the addresses of pA and pB. Since the address variables are of the same type, the memory region size substituted at the address variable pA (store object size) and the memory region size referenced at the address variable pB (load object size) are the same.

FIG. 13B(a) shows that the source program 200 is intermediate code which is inputted into the compiler process shown in FIG. 6, converted in the process from S1 to S3 in FIG. 6 and inputted at S4. A critical path such as that shown in FIG. 13C(a) in the critical path detection process (S10 in FIG. 7) is detected in the inputted intermediate code (FIG. 13B(a). Since the memory substitution process according to *pA++ the first time and the memory reference process according to *pB++ the second time have an ambiguous memory dependence, the critical path is a process flow including a series of processes: memory reference according to *pB and memory substitution according to *pA the first time, and memory reference according to *pB and memory substitution according to *pA the second time.

An ambiguous memory dependence detection process is performed for the critical path (S11 in FIG. 7, FIG. 8). In other words, the ambiguous memory dependence relaxation optimizing unit 114 searches the processes in the critical path from the top (S20 in FIG. 8), and detects an ambiguous memory dependence between the memory substitution process according to *pA++ the first time and the memory reference process according to *pB++ the second time (S21 in FIG. 8). Thus S21 in FIG. 8 is YES.

Only C6 is used as the yes/no executable flag in the inputted intermediate code. Thus there is a yes/no executable flag register resource besides C6. Thus, S24 in FIG. 8 is YES.

The registers r1 and r11 besides the memory necessary for ambiguous memory dependence in the memory reference process are considered in the yes/no shiftable assessment process of the memory reference process (S25). The registers r1 and r11 may depend on other processes, however in this case there are no dependences according to the definition or reference of the registers r1 and r11 between the memory substitution process and the memory reference process for the shift destination. Thus, S25 in FIG. 8 is YES since the memory reference process can be shifted.

Thus, in S26 in FIG. 8, the memory substitution process according to *pA++ the first time, and the memory reference process according to *pB++ the second time are judged to be in an ambiguous memory dependence relationship, thus S12 in FIG. 7 is YES and information about the memory access process is passed to the dependence relaxation process (S13 in FIG. 7). The dependence is relaxed for the memory access process having an ambiguous memory dependence (S13 in FIG. 7, FIG. 9).

The ambiguous memory dependence in the obtained memory access process is a definition for the memory according to *pA++ the first time, a reference to the memory according to *pB++ the second time and is in a true dependence relationship according to the memory. Thus, S30 in FIG. 9 is YES, and the ambiguous memory dependence relaxation optimizing unit 114 shifts the memory reference process according to *pB the second time as in FIG. 13B(b) in front of the memory substitution process according to *pA the first time (S31 in FIG. 9). Since the store object size according to pA in the memory access process and the load object size according to pB are equal, S32 in FIG. 9 is YES, and further, since the process is in the loop, S35 in FIG. 9 is YES.

Since the address variables pA and pB statically add elements one by one as pA++ and pB++ respectively in the loop, S37 is YES.

When S37 is YES, the ambiguous memory dependence relaxation optimizing unit 114 inserts an address comparison process at the end of the pre-header process in the loop, the address comparison process performing a comparison to find whether or not there is a match between the value of the register r1 which is allocated to the address variable pB and the value of the register r0 which is allocated to the address variable pA (S38 in FIG. 9).

Finally, in order to correctly preserve the logic when there is actual dependence in the ambiguous memory dependence, the ambiguous memory dependence relaxation optimizing unit 114 inserts a correction command with a yes/no executable flag after the memory reference process according to the shifted *pB (39 in FIG. 9) such that r11, which is the value obtained by the memory reference process according to *pB using the yes or no execution flag register when the addresses match, is overwritten atop the value r10 that has been substituted in the memory substitution process according to *pA.

In this way, the dependence relaxation in the dependence relaxation process (S13 in FIG. 7) is performed. Thus, S14 in FIG. 7 is YES and when the critical path for the intermediate code which has been dependence relaxed is re-detected (S15 in FIG. 7), the critical path includes only the true dependence between the memory reference according to *pB, the correction command with a yes/no executable flag and the memory substitution process according to *pA the first time. In other words, when the latency according to the memory reference process is 3 cycles, the length of the critical path goes from 7 cycles in FIG. 13C(a) to 4 cycles in FIG. 13C(b), being shortened by 3 cycles. Thus S16 in FIG. 7 is YES and S11 in FIG. 7 is executed recursively. In this example, since all of the ambiguous memory dependence is eliminated, the memory access for which the dependence is to be relaxed is not detected in the ambiguous memory dependence detection process the second time (S11 in FIG. 9). Thus, S12 in FIG. 7 is NO, and the ambiguous memory dependence relaxation optimizing unit 114 ends the process.

In this way, by performing an ambiguous memory dependence relaxation process (FIG. 7, S4 in FIG. 6), shortening the critical path, and the address comparison process is executed outside the loop, the process can be reduced since, object code is generated and the compiling process finished in the assembler code output process (S6 in FIG. 6).

[Assessment in the Loop Structure and in the Loop]

Figure 14C:
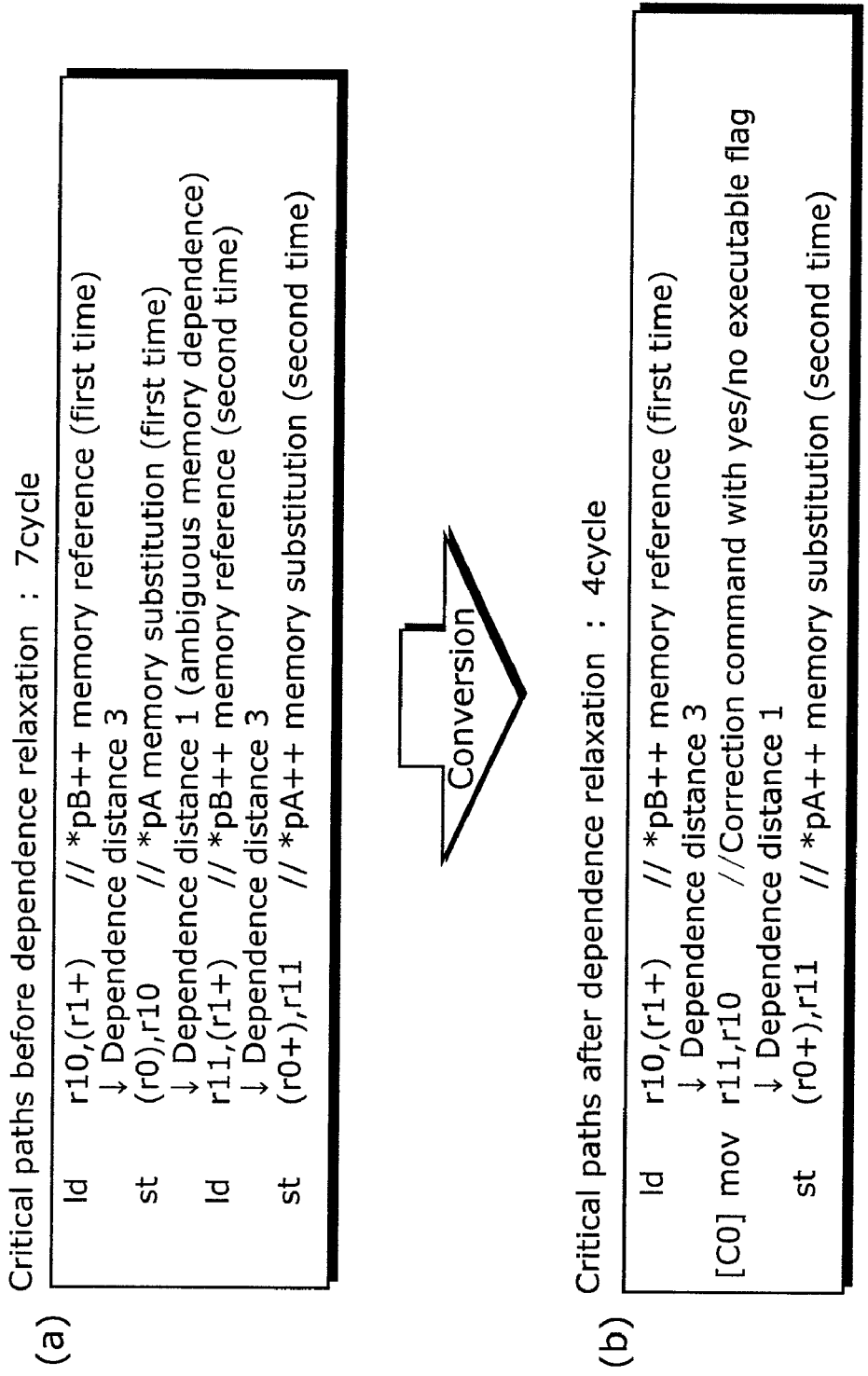

FIG. 14A through FIG. 14C are diagrams which describe a case in which the comparison process is needed in the loop using the dependence relaxation process for the same object size access in the loop structure.

FIG. 14A is a diagram which shows an example of the source program 200 in the loop structure.

The process content of the source program 200 is repeated 100 times in a loop and includes a process which substitutes the region value indicated by pB for the region indicated by pA using the arguments pA and pB in the function as base addresses, updates the address of pA with the value designated by the argument 'inc' as the increase value and updates the address such that pB shows the next element, and a process which substitutes the value in the region indicated by pB for the region indicated by pA using the updated pA and pB addresses and adds address values such that the next respective elements are shown in the addresses. Since the mutual address variables are of the same type, the memory region size substituted at the address variable pA (store object size) and the memory region size referenced at the address variable pB (load object size) are the same.

FIG. 14B(a) shows that the source program 200 is an intermediate code inputted into the compiler process shown in FIG. 6, converted from S1 to S3 in FIG. 6 and inputted into S4. A critical path as shown in FIG. 14C(a) is detected in the critical path detection process (S10 in FIG. 7) from the inputted intermediate code (FIG. 14B (a)). Since the memory substitution process according to *pA the first time and the memory reference process according to *pB++ the second time have an ambiguous memory dependence, the critical path is a process flow including a series of processes: memory reference according to *pB and memory substitution according to *pA the first time, and memory reference according to *pB and memory substitution according to *pA the second time.

An ambiguous memory dependence detection process is performed on the critical path (S11 in FIG. 7, FIG. 8). In other words, the ambiguous memory dependence relaxation optimizing unit 114 searches the processes in the critical path from the top (S20 in FIG. 8), and detects an ambiguous memory dependence between the memory substitution process according to *pA the first time and the memory reference process according to *pB the second time (S21 in FIG. 8). Thus S21 in FIG. 8 is YES.

Only C6 is used as the yes/no executable flag in the inputted intermediate code. Thus there is a yes/no executable flag register resource besides C6. Thus, S24 in FIG. 8 is YES.

The registers r1 and r11 besides the memory necessary for ambiguous memory dependence in the memory reference process are considered in the yes/no shiftable assessment process in the memory reference process (S25). There may be cases where the registers r1 and r11 depend on other processes, however in this case there are no dependences according to the definition or reference in the registers r1 and r11 between the memory substitution process and the memory reference process for the shift destination. Thus, S25 in FIG. 8 is YES since the memory reference process can be shifted.

Thus, in S26 in FIG. 8, the memory substitution process according to *pA++ the first time, and the memory reference process according to *pB++ the second time are judged to be in an ambiguous memory dependence relationship, S12 in FIG. 7 is YES and information about the memory access process is passed to the dependence relaxation process (S13 in FIG. 7). The dependence is relaxed for the memory access process with an ambiguous memory dependence (S13 in FIG. 7, FIG. 9).

The ambiguous memory dependence in the obtained memory access is a definition for the memory according to *pA++ the first time and a reference to the memory according to *pB++ the second time and is in a true dependence relationship due to the memory. Thus, S30 in FIG. 9 is YES, and the ambiguous memory dependence relaxation optimizing unit 114 shifts the memory reference process according to *pB the second time in front of the memory substitution process according to *pA the first time as in FIG. 14B(b) (S31 in FIG. 9). Since the store object size according to pA in the memory access process and the load object size according to pB are equal, S32 in FIG. 9 is YES, and further, since the process is in the loop, S35 in FIG. 9 is YES.

The increase value for the address variables pA and pB is +1 and +inc for pA, and +1 and +1 for pB in the loop, and S37 is NO since both addresses potentially have mutually different increase values.

When S37 is NO, a dependence assessment must be executed each time in the loop and since there is no address comparison process already in the preceding processes, S36 in FIG. 9 is NO. Thus, the ambiguous memory dependence relaxation optimizing unit 114 inserts the address comparison process, which compares to find whether or not there is a match between the value of the register r1 allocated to the address variable pB and the value of the register r0 allocated to the address variable pA, directly in front of the memory reference process shifted in S31 in FIG. 9 (S40 in FIG. 9).

Finally, in order to correctly preserve the logic when there is actual dependence in the ambiguous memory dependence, the ambiguous memory dependence relaxation optimizing unit 114 inserts a correction command with a yes/no executable flag after the memory reference process according to the shifted *pB (39 in FIG. 9) such that r11, which is the value obtained by the memory reference process according to *pB using the yes or no execution flag register when the addresses match, is overwritten atop the value r10 that has been substituted by the memory substitution process according to *pA.

In this way, the dependence relaxation in the dependence relaxation process (S13 in FIG. 7) is performed. Thus, S14 in FIG. 7 is YES and when the critical path for the dependence-relaxed intermediate code is re-detected (S15 in FIG. 7), the critical path includes only the true dependence between the memory reference according to *pB the first time, the correction command with a yes/no executable flag and the memory substitution process according to *pA. In other words, when the latency according to the memory reference process is 3 cycles, the length of the critical path goes from 7 cycles in FIG. 14C(a) to 4 cycles in FIG. 14C(b), being shortened by 3 cycles. Thus S16 in FIG. 7 is YES, and S11 in FIG. 7 is executed recursively. In this example, since all of the ambiguous memory dependence is eliminated, the memory access for which the dependence is relaxed is not detected in the ambiguous memory dependence detection process the second time (S11 in FIG. 9). Thus, S12 in FIG. 7 is NO, and the ambiguous memory dependence relaxation optimizing unit 114 ends the process.

In this way, by performing an ambiguous memory dependence relaxation process (FIG. 7, S4 in FIG. 6) and shortening the critical path even when the address increase values for the memory access differ, a higher-powered intermediate code can be achieved using a command scheduling process (S5 in FIG. 6), an object code is generated and the compiling process is finished in the assembler code output process (S6 in FIG. 6).

[Loop Structure/Differing Object Size Access (Small→Large)]

FIG. 15A and FIG. 15B are diagrams for describing the dependence relaxation process for differing object size access in the loop structure (small→large: the first memory access size is smaller than the second memory access size).

FIG. 15A is a diagram which shows an example of the source program 200 for which the object size access differs in the loop structure.

The process content of the source program 200 is repeated 100 times in a loop includes a process which substitutes the region value indicated by pB for the region indicated by pA using arguments pA and pB in the function as base addresses, and a process performed twice consecutively which adds the address values such that the respective elements are shown in the addresses of pA and pB. The memory region size substituted at the address variable pA (store object size) and the memory region size referenced at the address variable pB (load object size) are respectively 4 bytes and 2 bytes and thus the store object size is larger than the load object size.

FIG. 15B(a) shows that the source program 200 is intermediate code which is inputted into the compiler process shown in FIG. 6, converted in the process from S1 to S3 in FIG. 6 and is inputted at S4. A critical path as shown in FIG. 11C(a) is detected in the critical path detection process (S10 in FIG. 7) from the inputted intermediate code (FIG. 15B (a)). Since the memory substitution process according to *pA++ the first time and the memory reference process according to *pB++ the second time have an ambiguous memory dependence, the critical path is a process flow including a series of processes: memory reference according to *pB and memory substitution according to *pA the first time, and memory reference according to *pB and memory substitution according to *pA the second time.

An ambiguous memory dependence detection process is performed on the critical path (S11 in FIG. 7, FIG. 8). In other words, the ambiguous memory dependence relaxation optimizing unit 114 searches the processes in the critical path from the top (S20 in FIG. 8), and detects an ambiguous memory dependence between the memory substitution process using *pA++ the first time and the memory reference process according to *pB++ the second time (S21 in FIG. 8). Thus S21 in FIG. 8 is YES.

Only C6 is used as the yes/no executable flag in the inputted intermediate code. Thus there is a yes/no executable flag register resource besides C6. Thus, S24 in FIG. 8 is YES.

The registers r1 and r11 besides the memory necessary for ambiguous memory dependence in the memory reference process are considered in the yes/no shiftable assessment process of the memory reference process (S25). There may be cases where the registers r1 and r11 depend on other processes, however in this case there are no dependences between the memory substitution process and the memory reference process for the shift destination according to the definition or reference in the registers r1 and r11. Thus, S25 in FIG. 8 is YES since the memory reference process can be shifted.

Thus, in S26 in FIG. 8, the memory substitution process according to *pA++ the first time, and the memory reference process according to *pB++ the second time are judged to be in an ambiguous memory dependence relationship, S12 in FIG. 7 is YES and information about the memory access process is passed to the dependence relaxation process (S13 in FIG. 7). The dependence is relaxed for the memory access process which has an ambiguous memory dependence (S13 in FIG. 7, FIG. 9).

The ambiguous memory dependence in the obtained memory access process is a definition for the memory according to *pA++ the first time, a reference to the memory according to *pB++ the second time and is in a true dependence relationship according to the memory. Thus, S30 in FIG. 9 is YES, and the ambiguous memory dependence relaxation optimizing unit 114 shifts the memory reference process according to *pB the second time as in FIG. 15B(b) in front of the memory substitution process according to *pA the first time (S31 in FIG. 9). Since the store object size according to pA and the load object size according to pB in the memory access process are different, S32 in FIG. 9 is NO.

Thus when S32 in FIG. 9 is NO, the ambiguous memory dependence relaxation optimizing unit 114 inserts the address range comparison process directly in front of the memory reference process (S33 in FIG. 9). The address range comparison process is found using the process below. In other words, since the store object size according to pA and the load object size according to pB are respectively 4 bytes and 2 bytes, the greatest common denominator of the sizes is found to be 2 and the number of comparisons is found to be 4 bytes/gcd (4 bytes, 2 bytes). Additionally, since the register to which the address variable pB has been allocated is r1 and the register to which the address variable pA has been allocated is r0, a process for comparing the two address matches r0==r1+2*0 and r0==r1+2*1 is needed. The ambiguous memory dependence relaxation optimizing unit 114 inserts the found address range comparison process directly prior to the memory reference process (S33 in FIG. 9). In order to efficiently perform a comparison process in the intermediate code in FIG. 15B(b), an XOR operation for both addresses is taken, and a comparison process is performed to find whether or not the result is 0 or whether both addresses diverge by only 2 bytes.

Finally, in order to correctly preserve the logic when there is actual dependence in the ambiguous memory dependence, the ambiguous memory dependence relaxation optimizing unit 114 inserts a correction command with a yes/no executable flag after the memory reference process according to the shifted *pB (S34 in FIG. 9) such that r10, which is the value substituted in the memory substitution process according to *pA, is overwritten atop a data portion corresponding to a memory region portion in which there is a dependence in r11, which is the value obtained by the memory reference process according to *pB using the yes or no execution flag register when the addresses match. The ambiguous memory dependence optimizing unit 114 code expands the 16 bits from the 0th bit to the 15th bit in r11 as "extr r11, r10, 15, 0" when there is intermediate code in the bottom 16 bits, as in the memory image of the correction process in FIG. 1D. When there is a dependence in the top 16 bits, the ambiguous memory dependence optimizing unit 114 code expands and overwrites the 16 bits from the $16^{th}$ bit to the $31^{st}$ bit in r10 onto r11 as "extr r11, r10, 31, 16". The memory reference command function in r11 must be coordinated with whether or not code expansion is necessary. In this case, since the ldh process is anticipated to not only expand the 16 bit data in the memory into 32 bit data, but also substitute the 32 bit data for the 16 bit data, it is also anticipated that the ldh process performs code expansion in the correction process and code expansion is performed using the extr process.

In this way, the dependence relaxation in the dependence relaxation process (S13 in FIG. 7) is performed. Thus, S14 in FIG. 7 is YES and when the critical path for the intermediate code which has been dependence relaxed is re-detected (S15 in FIG. 7), the critical path includes only the true dependence between the memory reference according to *pB the first time, the correction command with yes/no executable flag and the memory substitution process according to *pA as in FIG. 11. In other words, when the latency according to the memory reference process is 3 cycles, the length of the critical path goes from the 7 cycles to 4 cycles, being shortened by 3 cycles. Thus S16 in FIG. 7 is YES and S11 in FIG. 7 is executed recursively. In this example, since all of the ambiguous memory dependence is eliminated and the memory access for which the dependence is relaxed is not detected in the ambiguous memory dependence detection process the second time (S11 in FIG. 9), S12 in FIG. 7 is NO, and the ambiguous memory dependence relaxation optimizing unit 114 finishes the process.

In this way, by performing an ambiguous memory dependence relaxation process (FIG. 7, S4 in FIG. 6) and shortening the critical path even when the sizes for memory access differ, a higher-powered intermediate code can be achieved using a command scheduling process (S5 in FIG. 6); an object code is generated and the compiling process is finished in the assembler code output process (S6 in FIG. 6).

[Loop Structure/Differing Object Size Access (Large→Small)]

FIG. 16A and FIG. 16B are diagrams for describing the dependence relaxation process for differing object sizes in the loop structure (large→small: memory access size the first time is larger than memory access size the second time).

FIG. 16A is a diagram which shows an example of the source program 200 with differing object size accesses in the loop structure.

The process content of the source program 200 is repeated 100 times in a loop includes a process which substitutes the region value indicated by pB for the region value indicated by pA using arguments pA and pB in the function as base addresses, and a process performed twice consecutively which adds the address values such that the respective elements are shown in the addresses of pA and pB. The memory region size substituted at the address variable pA (store object size) and the memory region size referenced at the address variable pB (load object size) are respectively 2 bytes and 4 bytes and thus the load object size is larger than the store object size.

FIG. 16B(a) shows that the source program 200 is intermediate code which is inputted into the compiler process shown in FIG. 6, converted in the process from S1 to S3 in FIG. 6 and is inputted at S4. The critical path as shown in FIG. 12C(a) is detected in the critical path detection process (S10 in FIG. 7) from the inputted intermediate code (FIG. 16B (a)). Since the memory substitution process according to *pA++ the first time and the memory reference process according to *pB++ the second time have an ambiguous memory dependence, the critical path is a process flow including a series of processes: memory reference according to *pB and memory substitution according to *pA the first time, and memory reference according to *pB and memory substitution according to *pA the second time.

The ambiguous memory dependence detection process is performed on the critical path (S11 in FIG. 7, FIG. 8). In other words, the ambiguous memory dependence relaxation optimizing unit 114 searches the processes in the critical path from the top (S20 in FIG. 8), and detects an ambiguous memory dependence between the memory substitution process using *pA++ the first time and the memory reference process according to *pB++ the second time (S21 in FIG. 8). Thus S21 in FIG. 8 is YES.

Only C6 is used as the yes/no executable flag in the inputted intermediate code. Thus there is a yes/no executable flag register resource besides C6. Thus, S24 in FIG. 8 is YES.

The registers r1 and r11 besides the memory necessary for ambiguous memory dependence in the memory reference process are considered in the yes/no shiftable assessment process in the memory reference process (S25). There may be cases where the registers r1 and r11 depend on other processes, however in this case there are no dependences according to the definition or reference for the registers r1 and r11 between the memory substitution process and the memory reference process for the shift destination. Thus, S25 in FIG. 8 is YES since the memory reference process can be shifted.

Thus, in S26 in FIG. 8, the memory substitution process according to *pA++ the first time, and the memory reference process according to *pB++ the second time are judged to be in an ambiguous memory dependence relationship and thus S12 in FIG. 7 is YES and information about the memory access process is passed to the dependence relaxation process (S13 in FIG. 7). The dependence is relaxed for the memory access process which has an ambiguous memory dependence (S13 in FIG. 7, FIG. 9).

The ambiguous memory dependence in the obtained memory access process is a definition for the memory according to *pA++ the first time, a reference to the memory according to *pB++ the second time and is in a true dependence relationship according to the memory. Thus, S30 in FIG. 9 is YES, and the ambiguous memory dependence relaxation optimizing unit 114 shifts the memory reference process according to *pB the second time as in FIG. 16B(b) in front of the memory substitution process according to *pA the first time (S31 in FIG. 9). Since the store object size according to pA in the memory access process and the load object size according to pB are different, S32 in FIG. 9 is NO.

Thus when S32 in FIG. 9 is NO, the ambiguous memory dependence relaxation optimizing unit 114 inserts the address range comparison process directly in front of the memory reference process (S33 in FIG. 9). The address range comparison process is found using the process below. In other words, since the store object size according to pA and the load object size according to pB are respectively 2 bytes and 4 bytes, the greatest common denominator of the sizes is found to be 2 and the number of comparisons n is found to be 4 bytes/gcd (2 bytes, 4 bytes). Additionally, since the register to which the address variable pB has been allocated is r1 and the register to which the address variable pA has been allocated is r0, a process for comparing the two address matches r0==r1+2*0 and r0==r1+2*1 is needed. The ambiguous memory dependence relaxation optimizing unit 114 inserts the found address range comparison process directly in front of the memory reference process (S33 in FIG. 9). In order to efficiently perform a comparison process in the intermediate code in FIG. 16B(b), an XOR operation for both addresses is taken, and a comparison process is performed to find whether or not the result is 0 or whether both addresses diverge by only 2 bytes.

Finally, in order to correctly preserve the logic when there is actual dependence during the ambiguous memory dependence, the ambiguous memory dependence relaxation optimizing unit 114 inserts a correction command with a yes/no executable flag after the memory reference process according to the shifted *pB (S34 in FIG. 9) such that a portion of the data corresponding to the memory region which includes a dependence in r10, which has been substituted by the memory substitution process according to *pA, over r11 which is the value obtained by the memory reference process according to *pB according to the yes or no execution flag register when the addresses match. When there is a dependence in the bottom 16 bit portion in the intermediate code in FIG. 16B(b), the ambiguous memory dependence relaxation optimizing unit 114 overwrites the bottom 16 bits in r10 atop the bottom 16 bits of r11 "vain r11, r10, r11" as in the memory image of the correction process in FIG. 12D. Additionally, when there is a dependence in the top 16 bit portion, the ambiguous memory dependence relaxation optimizing unit 114 overwrites the upper 16 bits in r10 onto the upper 16 bits as "vain r11, r10, r11".

In this way, the dependence relaxation in the dependence relaxation process (S13 in FIG. 7) is performed. Thus, S14 in FIG. 7 is YES and when the critical path for the dependence-relaxed intermediate code is re-detected (S15 in FIG. 7), the critical path includes only the true dependence between the memory reference according to *pB, the correction command with a yes/no executable flag and the memory substitution process according to *pA the first time as in FIG. 12C(b). In other words, when the latency according to the memory reference process is 3 cycles, the length of the critical path goes from 7 cycles to 4 cycles, being shortened by 3 cycles. Thus S16 in FIG. 7 is YES and S11 in FIG. 7 is executed recursively. In this example, since all of the ambiguous memory dependence is eliminated, the memory access for which the dependence is relaxed is not detected in the ambiguous memory dependence detection process the second time (S11 in FIG. 9). Thus, S12 in FIG. 7 is NO, and the ambiguous memory dependence relaxation optimizing unit 114 ends the process.

In this way, by performing an ambiguous memory dependence relaxation process (FIG. 7, S4 in FIG. 6) and shortening the critical path even when the sizes for memory access differ, a higher-powered intermediate code can be achieved using a command scheduling process (S5 in FIG. 6), and an object code is generated and the compiling process is finished in the assembler code output process (S6 in FIG. 6).

[Non-Loop Structure/Consecutive Same Object Size Access]

Figure 17C:

FIG. 17A through 17C are diagrams for describing the dependence relaxation process for when the object size access in the non-loop structure is consecutive.

FIG. 17A is a diagram which shows an example of the source program 200 in which the same object size is consecutive in the non-loop structure.

The process content of the source program 200 includes a process performed twice consecutively which uses arguments pA and pB in the function as base addresses, which substitutes the region value indicated by pB for the region value indicated by pA, and a process which adds the address values pA and pB such that the respective elements are shown. Since the mutual address variables are of the same type, the memory region size substituted at the address variable pA (store object size) and the memory region size referenced at the address variable pB (load object size) are the same.

FIG. 17B(a) shows that the source program 200 is intermediate code which is inputted into the compiler process shown in FIG. 6, converted in the process from S1 to S3 in FIG. 6 and inputted at S4. An intermediate code dependence relaxed as in FIG. 17B(b) is generated via the conversion described in FIG. 10A through FIG. 10C from the inputted intermediate code (FIG. 17B(a)), and further the dependence relaxation is performed in the same way on the continuous ambiguous memory dependence in the intermediate code. Thus "cmpeq C0, r1, r0" should be inserted directly before the memory access process "ld r12, (r1+)" according to pB++ the third time as in the intermediate code in FIG. 17C(a) in the front address comparison command detection assessment process (S36 in FIG. 9). However there is a similar cmpeq process in front, and the increase values of the address variables pA and pB are fixed from the previous cmpeq process up until just before the ld process to be inserted. Thus the address comparison process is assessed to be divertable. Thus, the ambiguous memory dependence relaxation optimizing unit 114 diverts the yes or no execution flag register which is the result of the existing address comparison process without inserting the address comparison process, and the correction process is inserted (S39 in FIG. 9).

In this way, in a consecutive memory access dependence relaxation, a further high-powered intermediate code (FIG. 17C(b)) can be achieved by deleting the address comparison process.

[Optimization Compiler Option]

When a compiler option is designated as an instruction for optimization control, the compiler option is analyzed in the optimization information analysis process (S2 in FIG. 6). As a result, even when the source program 200 which includes the ambiguous memory dependence to be optimized in for example FIG. 10A through FIG. 10C, the intermediate code converted in the same way according to the analysis result of the optimization information analysis process (S2 in FIG. 6) is NO in S9 in FIG. 7, the ambiguous memory dependence optimization can be controlled and an increase in the generation machine language code size can be prevented.

[Pragma Directive]

When the pragma directive which is an instruction for specifying the optimization target is designated as related to memory dependence relaxation, symbol information is analyzed in the optimization information analysis process (S2 in FIG. 6). As a result, when the source program 200 including the ambiguous memory dependence to be optimized in FIG. 10A through FIG. 10C is inputted, S22 in FIG. 8 is YES. Thus, the ambiguous memory dependence relaxation optimizing unit 114 confirms the match of whether or not pA and pB are designated in the symbol information and when they do not match, S23 is NO, the process is continued for the next ambiguous memory dependence and when there is a match, S23 is YES and the ambiguous memory dependence relaxation process is continued behind S24. In this way, the ambiguous memory dependence to be relaxed can be specified and an increase in code size and a balance of the execution properties can be adjusted.

As described above, the ambiguous dependence is relaxed by inserting the address comparison process and the correction process depending on the result of the address comparison process into the ambiguous memory dependence process by using the compiler system according to present embodiment. Thus, the critical path is shortened and the process speed when the program is executed can be improved.

As above, the compiler system according to the embodiment of the present invention is described based on the embodiment, however the present invention is not limited to the embodiment. In the above embodiment, a compiler system for the C language is anticipated, however the present invention is not limited to only the C language. The significance of the present invention is maintained even when another programming language is used.

In the above embodiment, a compiler option is used as a user interface through which a programmer controls the dependence relaxation optimization, however the present invention is not limited to this interface. For example, information may be communicated by a pragma designation. The communication method is also not limited to a method which designates per file as in the above embodiment, and may have a structure which describes a processing range.

In the above embodiment, a pragma directive is used as a user interface in which the pragma designates the dependence relaxation target, however the present invention is not limited to this interface. For example, information may be communicated by option designation. The communication method is also not limited to a method which writes symbol information as in the above embodiment, and may have a structure which describes a processing range. Further, use may be designated per file as the granularity of the designated area or as the granularity in general. A data cache or an internal/external memory are anticipated as a memory access process in the above embodiment, however the present invention is not limited to this memory space. The significance of the present invention is maintained even with other shared resources. For example, another command such as an access command to a memory-mapped external port through which resources can be shared dynamically may be used.

In the above embodiment, dependence relaxation related to an ambiguous memory dependence is anticipated, however the present invention is not limited to only the ambiguous memory dependence. For example, the significance of the present invention is maintained even when there is a non-ambiguous, true dependence.

In the above embodiment, it is anticipated that there is an interlock as a target processor (a phenomenon in which the execution of consecutive commands is dynamically stopped by the processor when the execution result of a leading command is not forwarded to the register referenced by subsequent processes between commands generating a data dependence relationship), however the present invention is not limited to this. When no interlock is generated, a processor which utilizes architecture to statically solve these kinds of problems can be applied to the present invention.

For example, the dependence is not relaxed using the ambiguous memory dependence relaxation optimizing unit 114, and when the object is to eliminate unnecessary latency wait time, the critical path may be shortened without interchanging the load process and the store process.

In the above embodiment, a correction process with conditions according to the yes/no execution flag depending on the result of the address comparison process is inserted, however the present invention does not limit only the yes/no execution condition to the correction process. For example, by applying a yes/no execution condition to the load command, unnecessary load processes can be eliminated.

The embodiment disclosed here is exemplary in all points, and should not be understood as limited. The range of the present invention is not that of the above explanation, and is instead shown by the range of the Claims; all changes in the range of the Claims with the same meaning are intended.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to a process executed by a compiler, an operating system (OS) and a processor which relax the ambiguous dependence of a command for which resources can be dynamically shared.

What is claimed is:

1. A program re-writing apparatus which re-writes an inputted program into a program for a processor for controlling whether or not a process is executed based on a yes or no execution flag, said program re-writing apparatus comprising:

a comparison process inserter, comprising a processor, configured to insert a comparison process into the inputted program, the comparison process comparing first address information, which is memory address information accessed by a store process included in the inputted program, and second address information, which is address information of a memory accessed by a load process included in the inputted program, and writing a comparison result into the yes or no execution flag;

a logic preservation process inserter, comprising a processor, configured to insert a yes or no execution flag-attached logic preservation process into the inputted program, the yes or no execution flag-attached logic preservation process being a process executed based on a value of the yes or no execution flag and preserving a same result as a result of the inputted program when executed; and an ambiguous memory dependence analyzer configured to analyze whether or not there is an ambiguous true memory dependence relationship between the store process and the load process;

an execution sequence modifier configured to modify an execution sequence of the store process and the load process which have been judged to be in an ambiguous true memory dependence relationship by said ambiguous memory dependence analyzer; and a data size comparator configured to judge whether or not a predetermined condition is satisfied, the condition being that a size of data accessed once by the store process and a size of data accessed once by the load process are equal, wherein the store process is a process for writing data into the memory, the load process is a process for reading data out of the memory, and said logic preservation process inserted is configured to insert, when it is judged by said data size comparator that the predetermined condition is satisfied, an overwrite process into the inputted program, the overwrite process is a process in which the store process overwrites a value read out of the memory by the load process with a value written into the memory, as the logic preservation process.

2. The program re-writing apparatus according to claim 1, further comprising:

a critical path detector configured to detect a process which is a critical path from the inputted program; wherein the ambiguous memory dependence analyzer is configured to judge whether or not the store process and the load process are included in the critical path detected by said critical path detector, and when the store process and the load processes are included in the critical path, to analyze whether or not there is an ambiguous true memory dependence relationship between the store process and the load process and, wherein said comparison process inserter is configured to insert the comparison process into the store process and the load process which have been judged to be in an ambiguous true memory dependence relationship by said ambiguous memory dependence analyzer.

3. The program re-writing apparatus according to claim 1, wherein said comparison process inserter is configured to insert the comparison process one step before the logic preservation process as an execution sequence.

4. The program re-writing apparatus according to claim 1, further comprising:

a regularity judger configured to judge whether or not a predetermined condition is satisfied, the predetermined condition being that the store and the load processes are consecutive, and that a memory address accessed in each memory access process is regularly renewed, wherein said comparison process inserter is configured to, when it is judged by said regularity judger that the predetermined condition is satisfied, insert the comparison process in a position before the logic preservation process, which is at a top of a sequence for the store and load processes, as an execution sequence.

5. The program re-writing apparatus according to claim 1, further comprising:

a regularity judger configured to judge whether or not a predetermined condition is satisfied, the predetermined condition being that the store and the load processes are repeatedly executed and that a memory address accessed in each memory access process is regularly renewed, wherein said comparison process inserter is configured to, when it is judged that the predetermined condition is satisfied in said regularity judger, insert the comparison process in a position before the store and the load processes are repeated, as an execution sequence.

6. A program re-writing apparatus which re-writes an inputted program into a program for a processor for controlling whether or not a process is executed based on a yes or no execution flag, said program re-writing apparatus comprising:

a comparison process inserter, comprising a processor, configured to insert a comparison process into the inputted program, the comparison process comparing first address information, which is memory address information accessed by a store process included in the inputted program, and second address information, which is address information of a memory accessed by a load process included in the inputted program, and writing a comparison result into the yes or no execution flag;

a logic preservation process inserter, comprising a processor, configured to insert a yes or no execution flag-attached logic preservation process into the inputted program, the yes or no execution flag-attached logic preservation process being a process executed based on a value of the yes or no execution flag and preserving a same result as a result of the inputted program when executed;

an ambiguous memory dependence analyzer configured to analyze whether or not there is an ambiguous true memory dependence relationship between the store process and the load process;

an execution sequence modifier configured to modify an execution sequence of the store process and the load process which have been judged to be in an ambiguous true memory dependence relationship by said ambiguous memory dependence analyzer; and a data size comparator configured to judge whether or not a predetermined condition is satisfied, the predetermined condition being that a data size accessed once by the load process is smaller than a data size accessed once by the store process, wherein the store process is a process for writing data into the memory the load process is a process for reading data out of the memory, and said logic preservation process inserter is configured to, when it is judged by said data size comparator that the predetermined condition is fulfilled, insert an overwrite process into the inputted program as a logic preservation process, the overwrite process writing over a value read out of the memory by the load process with a partial value written into the memory by the store process.

7. A program re-writing apparatus which re-writes an inputted program into a program for a processor for controlling whether or not a process is executed based on a yes or no execution flag, said program re-writing apparatus comprising:

a comparison process inserter, comprising a processor, configured to insert a comparison process into the inputted program, the comparison process comparing first address information, which is memory address information accessed by a store process included in the inputted program, and second address information, which is address information of a memory accessed by a load process included in the inputted program, and writing a comparison result into the yes or no execution flag;

a logic preservation process inserter, comprising a processor, configured to insert a yes or no execution flag-attached logic preservation process into the inputted program, the yes or no execution flag-attached logic preservation process being a process executed based on a value of the yes or no execution flag and preserving a same result as a result of the inputted program when executed;

an ambiguous memory dependence analyzer configured to analyze whether or not there is an ambiguous true memory dependence relationship between the store process and the load process;

an execution sequence modifier configured to modify an execution sequence of the store process and the load process which have been judged to be in an ambiguous true memory dependence relationship by said ambiguous memory dependence analyzer; and a data size comparator configured to judge whether or not a predetermined condition is satisfied, the predetermined condition being that a data size accessed once by the load process is larger than a data size accessed once by the store process; wherein the store process is a process for writing data into the memory the load process is a process for reading data out of the memory, and said logic preservation process inserter is configured to, when it is judged in said data size comparator that the predetermined condition is fulfilled, insert an overwrite process into the inputted program as a logic preservation process, the overwrite process writing over a partial value read out of the memory by the load process with a value written into the memory by the store process.

8. The program re-writing apparatus according to claim 1, further comprising:

an optimizing designation information adder configured to receive optimizing instruction information related to optimization, wherein said comparison process inserter and said logic preservation process inserter operate selectively based on the optimizing instruction information received by said optimizing designation information adder.

9. The program re-writing apparatus according to claim 8, wherein said optimizing designation information adder is configured to receive optimizing instruction information related to performing control for ambiguous memory dependence relaxation, and when said comparison process inserter has received the optimizing instruction information related to performing control for ambiguous memory dependence relaxation, said comparison process inserter and said logic preservation process inserter do not function.

10. The program re-writing apparatus according to claim 8, wherein said optimizing designation information adder is configured to receive symbol information which specifies a memory access process for ambiguous memory dependence relaxation, and said comparison process inserter is configured to insert the comparison process into the memory access process specified by the symbol information received by said optimizing designation information adder.

11. A program re-writing method which re-writes an inputted program into a program for a processor for controlling whether or not a process is executed based on a yes or no execution flag, said program re-writing method comprising:

inserting a comparison process into the inputted program, the comparison process comparing first address information, which is memory address information accessed by a store process included in the inputted program, and second address information, which is address information of a memory accessed by a load process included in the inputted program, and writing a comparison result into the yes or no execution flag;

inserting a yes or no execution flag-attached logic preservation process into the inputted program, the yes or no execution flag-attached logic preservation process being a process executed based on a value of the yes or no execution flag and preserving the same result as a result of the inputted program when executed;

analyzing whether or not there is an ambiguous true memory dependence relationship between the store process and the load process;

modifying an execution sequence of the store process and the load process which have been judged to be in an ambiguous true memory dependence relationship; and judging whether or not a predetermined condition is satisfied, the predetermined condition being that the size of the data accessed once by the store process and the size of the data accessed once by the load process are equal, wherein the store process is a process for writing data into the memory, the load process is a process for reading data out of the memory, and in the inserting a yes or no execution flag attached logic preservation process, when it is judged, in the judging whether or not a predetermined condition is satisfied, that the predetermined condition is satisfied, an overwrite process is inserted into the inputted program, the overwrite process is a process in which the store process overwrites a value read out of the memory by the load process with a value written into the memory, as the logic preservation process.

12. The program re-writing method according to claim 11, further comprising:

detecting a process which is a critical path from the inputted program; and judging whether or not the store process and the load process are included in the critical path detected in the detecting the critical path, and when the store process and the load processes are included in the critical path, analyzing whether or not there is an ambiguous true memory dependence relationship between the store process and the load process, wherein in the inserting a comparison process and writing a comparison result, the comparison process is inserted into the store process and the load process which have been judged to be in an ambiguous true memory dependence relationship in the judging the critical path.

13. The program re-writing method according to claim 11, wherein in the inserting a comparison process and in the writing a comparison result, the comparison process is inserted one step before the logic preservation process as an execution sequence.

14. The program re-writing apparatus according to claim 6, wherein said comparison process inserter is configured to insert the comparison process one step before the logic preservation process as an execution sequence.

15. The program re-writing apparatus according to claim 6, further comprising:

a regularity judger configured to judge whether or not a predetermined condition is satisfied, the predetermined condition being that the store and the load processes are consecutive, and that a memory address accessed in each memory access process is regularly renewed, wherein said comparison process inserter is configured to, when it is judged by said regularity judger that the predetermined condition is satisfied, insert the comparison process in a position before the logic preservation process, which is at a top of a sequence for the store and load processes, as an execution sequence.

16. The program re-writing apparatus according to claim 6, further comprising:
a regularity judger configured to judge whether or not a predetermined condition is satisfied, the predetermined condition being that the store and the load processes are repeatedly executed and that a memory address accessed in each memory access process is regularly renewed,
wherein said comparison process inserter is configured to, when it is judged by the regularity judger that the predetermined condition is satisfied insert the comparison process in a position before the store and the load processes are repeated, as an execution sequence.

17. The program re-writing apparatus according to claim 7, wherein said comparison process inserter is configured to insert the comparison process one step before the logic preservation process as an execution sequence.

18. The program re-writing apparatus according to claim 7, further comprising:
a regularity judger configured to judge whether or not a predetermined condition is satisfied, the predetermined condition being that the store and the load processes are consecutive, and that a memory address accessed in each memory access process is regularly renewed,
wherein said comparison process inserter is configured to, when it is judged by said regularity judger that the predetermined condition is satisfied, insert the comparison process in a position before the logic preservation process, which is at a top of a sequence for the store and load processes, as an execution sequence.

19. The program re-writing apparatus according to claim 7, further comprising:
a regularity judger configured to judge whether or not a predetermined condition is satisfied, the predetermined condition being that the store and the load processes are repeatedly executed and that a memory address accessed in each memory access process is regularly renewed,
wherein said comparison process inserter is configured to, when it is judged by the regularity judger that the predetermined condition is satisfied insert the comparison process in a position before the store and the load processes are repeated, as an execution sequence.

20. The program re-writing method according to claim 11, further comprising:
judging whether or not a regularity condition is satisfied, the regularity condition being that the store and the load processes are consecutive, and that a memory address accessed in each memory access process is regularly renewed,
wherein, in inserting the comparison process, when it is judged that the regularity condition is satisfied, inserting the comparison process in a position before the logic preservation process, which is at a top of a sequence for the store and load processes, as an execution sequence.

21. The program re-writing method according to claim 11, further comprising:
judging whether or not a regularity condition is satisfied, the regularity condition being that the store and the load processes are repeatedly executed and that a memory address accessed in each memory access process is regularly renewed,
wherein, in inserting the comparison process, when it is judged that the regularity condition is satisfied, inserting the comparison process in a position before the store and the load processes are repeated, as an execution sequence.

22. A program re-writing method which re-writes an inputted program into a program for a processor for controlling whether or not a process is executed based on a yes or no execution flag, said program re-writing method comprising:
inserting a comparison process into the inputted program, the comparison process comparing first address information, which is memory address information accessed by a store process included in the inputted program, and second address information, which is address information of a memory accessed by a load process included in the inputted program, and writing a comparison result into the yes or no execution flag;
inserting a yes or no execution flag-attached logic preservation process into the inputted program, the yes or no execution flag-attached logic preservation process being a process executed based on a value of the yes or no execution flag and preserving the same result as a result of the inputted program when executed;
analyzing whether or not there is an ambiguous true memory dependence relationship between the store process and the load process;
modifying an execution sequence of the store process and the load process which have been judged to be in an ambiguous true memory dependence relationship; and
judging whether or not a predetermined condition is satisfied, the predetermined condition being that a data size accessed once by the load process is smaller than a data size accessed once by the store process,
wherein the store process is a process for writing data into the memory,
the load process is a process for reading data out of the memory, and
in the inserting of a yes or no execution flag attached logic preservation process, when it is judged by the judging that the predetermined condition is fulfilled, an overwrite process is inserted into the inputted program as a logic preservation process, the overwrite process writing over a value read out of the memory by the load process with a partial value written into the memory by the store process.

23. The program re-writing method according to claim 22, wherein in the inserting a comparison process and in the writing a comparison result, the comparison process is inserted one step before the logic preservation process, as an execution sequence.

24. The program re-writing method according to claim 22, further comprising:
judging whether or not a regularity condition is satisfied, the regularity condition being that the store and the load processes are consecutive, and that a memory address accessed in each memory access process is regularly renewed,
wherein, in inserting the comparison process, when it is judged that the regularity condition is satisfied, inserting the comparison process in a position before the logic preservation process, which is at a top of a sequence for the store and load processes, as an execution sequence.

25. The program re-writing method according to claim 22, further comprising:
judging whether or not a regularity condition is satisfied, the regularity condition being that the store and the load processes are repeatedly executed and that a memory address accessed in each memory access process is regularly renewed,
wherein, in inserting the comparison process, when it is judged that the regularity condition is satisfied, inserting the comparison process in a position before the store and the load processes are repeated, as an execution sequence.

26. A program re-writing method which re-writes an inputted program into a program for a processor for controlling whether or not a process is executed based on a yes or no execution flag, said program re-writing method comprising:

inserting a comparison process into the inputted program, the comparison process comparing first address information, which is memory address information accessed by a store process included in the inputted program, and second address information, which is address information of a memory accessed by a load process included in the inputted program, and writing a comparison result into the yes or no execution flag;

inserting a yes or no execution flag-attached logic preservation process into the inputted program, the yes or no execution flag-attached logic preservation process being a process executed based on a value of the yes or no execution flag and preserving the same result as a result of the inputted program when executed;

analyzing whether or not there is an ambiguous true memory dependence relationship between the store process and the load process;

modifying an execution sequence of the store process and the load process which have been judged to be in an ambiguous true memory dependence relationship; and judging whether or not a predetermined condition is satisfied, the predetermined condition being that a data size accessed once by the load process is larger than a data size accessed once by the store process, wherein the store process is a process for writing data into the memory, the load process is a process for reading data out of the memory, and in the inserting a comparison process, when it is judged, in judging that the predetermined condition is fulfilled, inserting an overwrite process into the inputted program as a logic preservation process, the overwrite process writing over a partial value read out of the memory by the load process with a value written into the memory by the store process.

27. The program re-writing method according to claim 26, wherein in said inserting a comparison process and in writing a comparison result, the comparison process is inserted one step before the logic preservation process as an execution sequence.

28. The program re-writing method according to claim 26, further comprising:

judging whether or not a regularity condition is satisfied, the regularity condition being that the store and the load processes are consecutive, and that a memory address accessed in each memory access process is regularly renewed, wherein in inserting the comparison process, when it is judged that the regularity condition is satisfied, inserting the comparison process in a position before the logic preservation process, which is at a top of a sequence for the store and load processes, as an execution sequence.

29. The program re-writing method according to claim 26, further comprising:

judging whether or not a regularity condition is satisfied, the regularity condition being that the store and the load processes are repeatedly executed and that a memory address accessed in each memory access process is regularly renewed, wherein in inserting the comparison process, when it is judged that the regularity condition is satisfied, inserting the comparison process in a position before the store and the load processes are repeated, as an execution sequence.

* * * * *